United States Patent
Hiraga et al.

(10) Patent No.: US 11,447,112 B2
(45) Date of Patent: Sep. 20, 2022

(54) VEHICLE ATTITUDE CONTROL SYSTEM

(71) Applicant: MAZDA MOTOR CORPORATION, Hiroshima (JP)

(72) Inventors: Naoki Hiraga, Hiroshima (JP); Daisuke Umetsu, Hiroshima (JP); Fuminori Kato, Higashihiroshima (JP); Hiroyuki Ogata, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 109 days.

(21) Appl. No.: 16/882,034

(22) Filed: May 22, 2020

(65) Prior Publication Data

US 2020/0384967 A1 Dec. 10, 2020

(30) Foreign Application Priority Data

Jun. 4, 2019 (JP) .............................. JP2019-104205
Feb. 20, 2020 (JP) .............................. JP2020-026921

(51) Int. Cl.
*B60T 8/24* (2006.01)
*B60T 8/60* (2006.01)
(Continued)

(52) U.S. Cl.
CPC .............. *B60T 8/241* (2013.01); *B60T 8/171* (2013.01); *B60T 8/266* (2013.01); *B60T 8/74* (2013.01);
(Continued)

(58) Field of Classification Search
None
See application file for complete search history.

(56) References Cited

U.S. PATENT DOCUMENTS

| 8,554,414 B2 | 10/2013 | Koto et al. |
| 2005/0012392 A1* | 1/2005 | Kato ...................... B60T 8/243 303/191 |

(Continued)

FOREIGN PATENT DOCUMENTS

| EP | 2578460 A1 | 10/2013 |
| EP | 3418146 A1 | 12/2018 |

(Continued)

OTHER PUBLICATIONS

European Patent Office, Extended European Search Report Issued in Application No. 20176293.7, dated Sep. 14, 2020, Germany, 8 pages.

*Primary Examiner* — Adam D Tissot
(74) *Attorney, Agent, or Firm* — Alleman Hall Creasman & Tuttle LLP

(57) ABSTRACT

Disclosed is a vehicle attitude control system for controlling the attitude of a vehicle in which a road wheel suspension is configured such that a roll axis of a vehicle body inclines downwardly in a forward direction. The vehicle attitude control system includes: a lateral acceleration sensor operable to detect a lateral acceleration; a brake actuator operable to apply a braking force; and a brake control device operable, based on a traveling state of the vehicle, to generate the braking force, wherein the brake control device is configured to execute vehicle attitude control of applying, to an inner rear road wheel, a larger braking force when the lateral acceleration of the vehicle is relatively large than when the lateral acceleration is relatively small, thereby suppressing uplift of an inner rear portion of the vehicle body.

14 Claims, 13 Drawing Sheets

(51) Int. Cl.
*B60T 8/17* (2006.01)
*B60T 8/1755* (2006.01)
*B60T 8/171* (2006.01)
*B60T 8/26* (2006.01)
*B60T 8/74* (2006.01)

(52) U.S. Cl.
CPC ....... *B60T 2220/04* (2013.01); *B60T 2230/04* (2013.01); *B60T 2250/04* (2013.01)

(56) References Cited

U.S. PATENT DOCUMENTS

2007/0067085 A1* 3/2007 Lu .......................... B60T 8/172
 701/70
2015/0032333 A1* 1/2015 Nakatsu .............. B60W 10/184
 701/37

FOREIGN PATENT DOCUMENTS

| | | |
|---|---|---|
| JP | 5193885 B2 | 5/2013 |
| KR | 20140021403 A | 2/2014 |
| KR | 101995074 B1 | 7/2019 |

\* cited by examiner

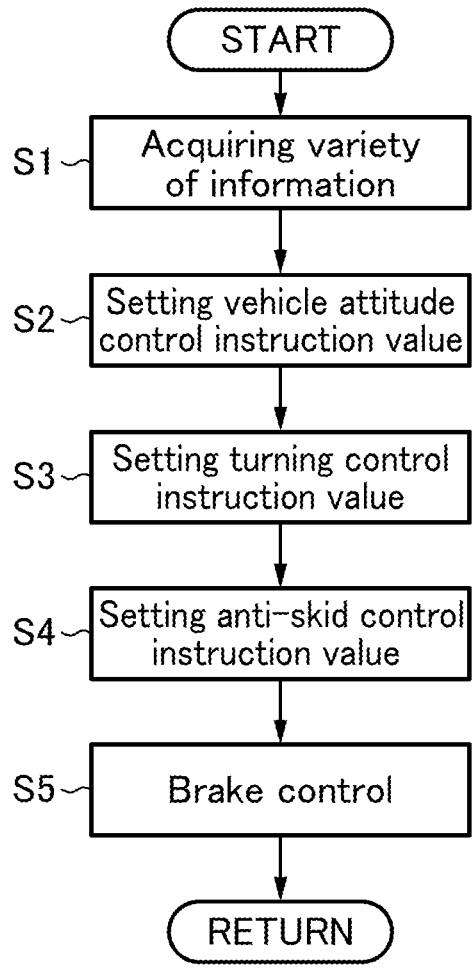

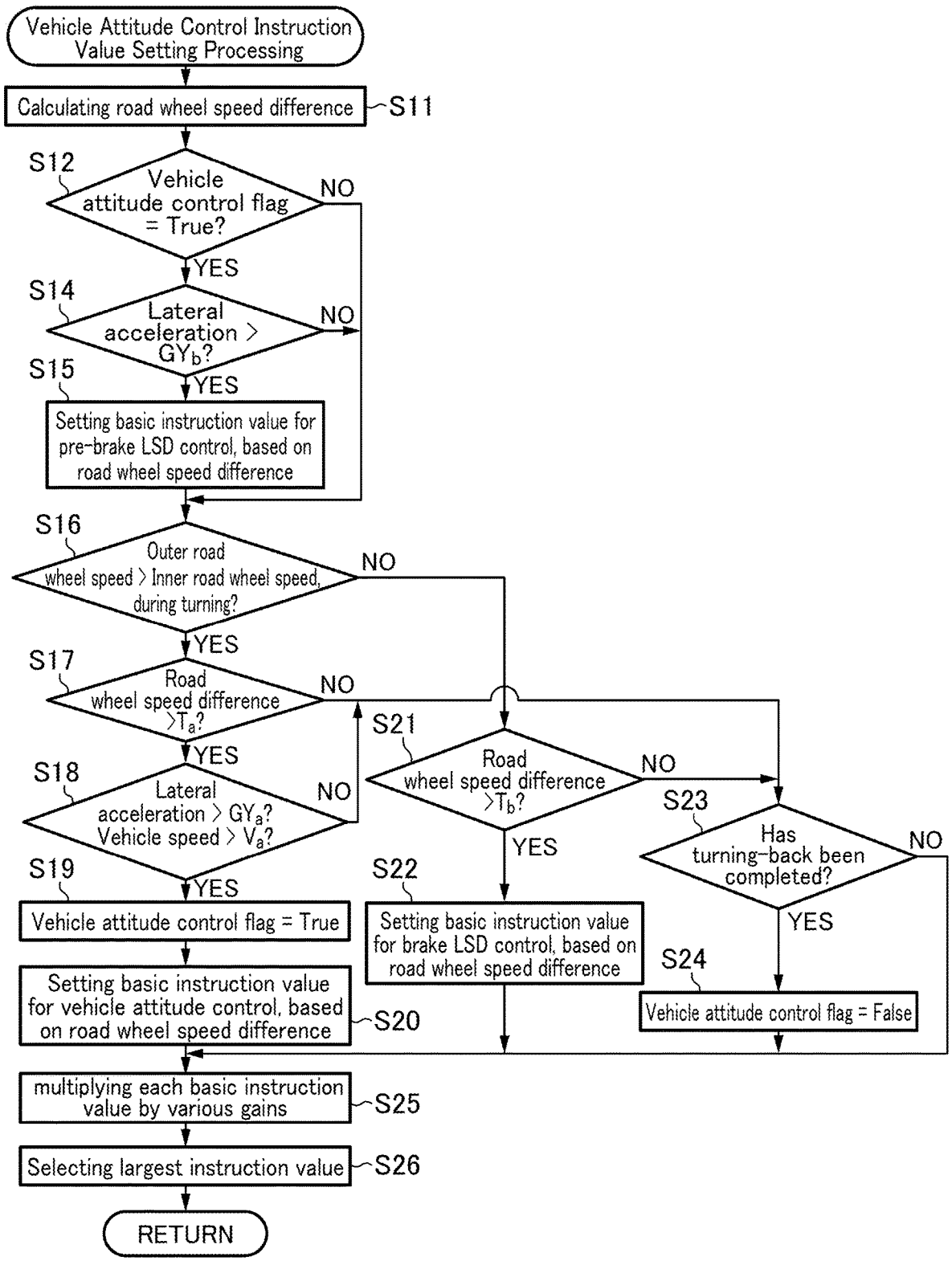

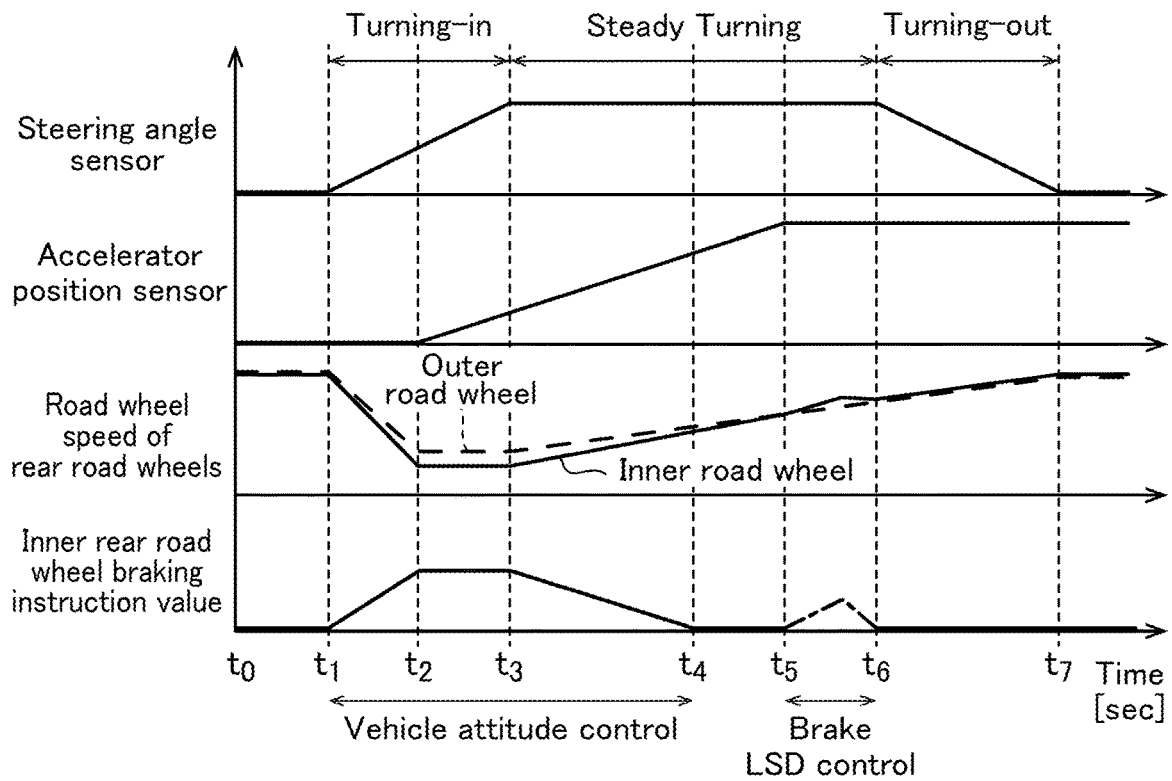
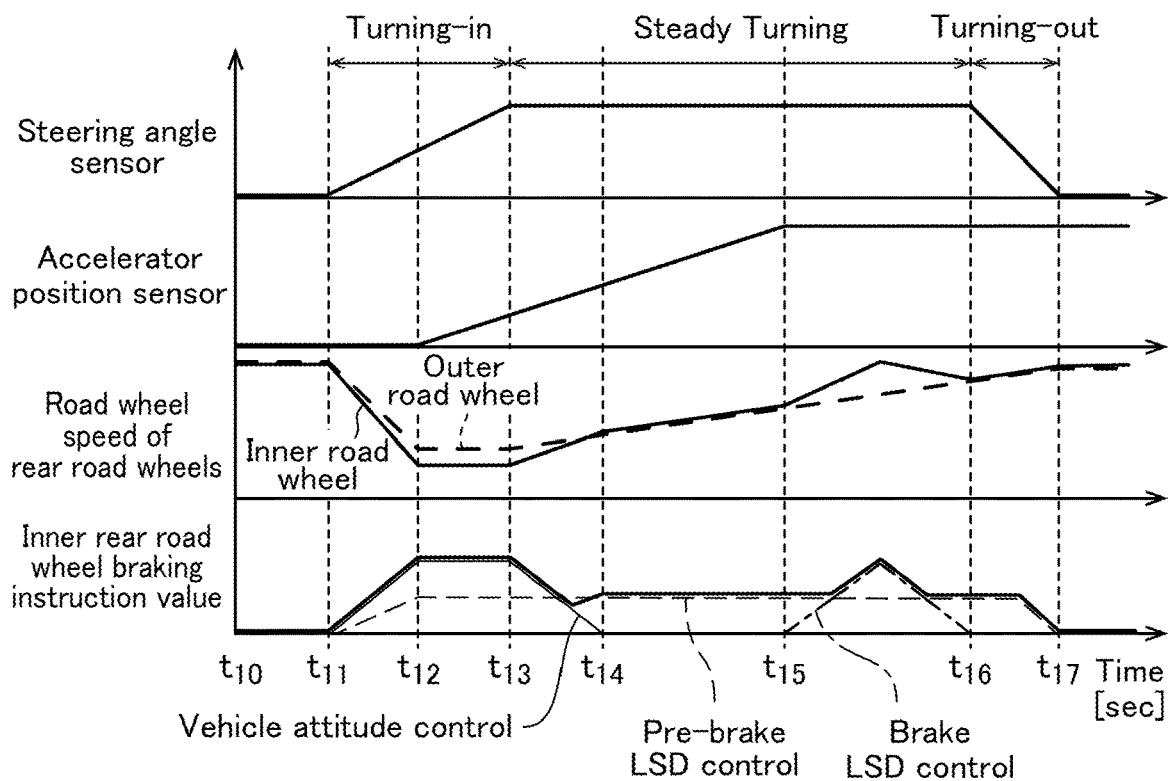

VEHICLE ATTITUDE CONTROL SYSTEM

TECHNICAL FIELD

The present invention relates to a vehicle attitude control system, and more particularly to a vehicle attitude control system for controlling the attitude of a vehicle in which a road wheel suspension is configured such that a roll axis of a vehicle body inclines downwardly in a forward direction.

BACKGROUND ART

In JP 5193885B (Patent Document 1), there is described a vehicle motion control device. This vehicle motion control device is configured to apply different braking or driving forces, respectively, to right and left road wheels of a vehicle, based on a yaw moment control instruction value calculated from information about skid of the vehicle. In this way, the invention described in the Patent Document 1 makes it possible to automatically perform acceleration/deceleration of the vehicle in connection with steering wheel manipulation, thereby reducing a skid in a critical driving range to improve safety performance. Specifically, the invention described in the Patent Document 1 intends to apply different braking or driving forces, respectively, to the right and left road wheels, in accordance with steering wheel manipulation by a driver, to apply a yaw moment directly to the vehicle, thereby controlling a yaw motion of the vehicle.

Further, with regard to the attitude of a vehicle during turning, it is also attempted to improve this property based on setting of basic specifications of suspensions of the vehicle. That is, it is also studied to set the basic specifications of the suspensions such that the vehicle is more likely to undergo a pitching motion, thereby making it possible to naturally produce an appropriate diagonal rolling motion in a vehicle body of the vehicle, even during turning with a low lateral acceleration. More specifically, the basic specifications of the suspensions of the vehicle are set such that a roll axis of the vehicle body inclines downwardly in a forward direction (a front end of the vehicle body is sunk down), so that the vehicle body becomes more likely to undergo a pitching motion, thereby making it possible to produce an appropriate diagonal rolling motion during turning.

CITATION LIST

Patent Document

Patent Document 1: JP 5193885B

SUMMARY OF INVENTION

Technical Problem

However, if the basic specifications of the suspensions are set such that, during turning in a low lateral acceleration range, a pitching motion is induced in the vehicle body to produce an appropriate diagonal rolling motion, there arises a problem that an inner rear portion of the vehicle body being turning becomes more likely to be lifted up, in the range in which the lateral acceleration is high to a certain degree. Such a phenomenon also occurs in the range in which the lateral acceleration is far less than a lateral acceleration threshold at which a skid starts to occur in the vehicle being turning. That is, even in a lateral acceleration range in which the lateral acceleration is relatively low and thereby exerts substantially no influence on turning performance of the vehicle, the inner rear portion of the vehicle body being turning can be lifted up. As above, in the vehicle in which the roll axis of the vehicle body is set to incline downwardly in the forward direction, the inner rear portion of the vehicle body being turning can be lifted up, even in the range in which the lateral acceleration is not really high, so that there is a possibility of giving a driver or passenger a feeling of insecurity.

It is therefore an object of the present invention to provide a vehicle attitude control system for use in a vehicle in which a suspension is set such that a roll axis of a vehicle body inclines downwardly in a forward direction, wherein the vehicle attitude control system is capable of suppressing uplift of an inner rear portion of the vehicle body during turning.

Solution to Technical Problem

In order to solve the above technical problem, the present invention provides a vehicle attitude control system for controlling an attitude of a vehicle having front and rear road wheels in which a road wheel suspension is configured such that a roll axis of a vehicle body inclines downwardly in a forward direction. The vehicle attitude control system comprises: a lateral acceleration sensor configured to detect a lateral acceleration of the vehicle being traveling; a brake actuator configured to apply a braking force to each road wheel of the vehicle; and a brake control device configured to send a control signal to the brake actuator to cause the brake actuator to generate the braking force, based on a traveling state of the vehicle, wherein the brake control device is configured to execute vehicle attitude control, during turning of the vehicle based on turning manipulation of a steering wheel of the vehicle, and wherein in the vehicle attitude control, a larger braking force is applied to an inner rear road wheel of the vehicle being turning, when the lateral acceleration of the vehicle is relatively large than when the lateral acceleration of the vehicle is relatively small, thereby suppressing uplift of an inner rear portion of the vehicle body.

In the vehicle in which a road wheel suspension is configured such that a roll axis of a vehicle body inclines downwardly in a forward direction, a pitching motion is easily induced, so that it is possible to produce a diagonal rolling motion even during turning of the vehicle with a low lateral acceleration, thereby improving turning performance. However, in this type of vehicle in which the roll axis is inclined downwardly in the forward direction, when the lateral acceleration is increased to some degree, there arises a specific technical problem that an inner rear portion of the vehicle body tends to be lifted up, thereby giving a driver or passenger a feeling of insecurity. The present invention is intended to solve the technical problem specific to the type of vehicle in which the roll axis of the vehicle body is inclined downwardly in the forward direction. In the vehicle attitude control system of the present invention having the above feature, during turning of the vehicle based on the turning manipulation of the steering wheel, a larger braking force is applied to an inner rear road wheel of the vehicle being turning, when the lateral acceleration of the vehicle is relatively large than when the lateral acceleration of the vehicle is relatively small. Upon applying the braking force to the inner rear road wheel of the vehicle, a force acts on the vehicle body through the road wheel suspension to pull the inner rear portion of the vehicle body downwardly, so that it is possible to suppress uplift of the inner rear portion of the vehicle body. The braking force to be applied to the inner rear road wheel is not at a level enough to substantially exert an influence on the turning performance of the vehicle, but acts to suppress uplift of the inner rear portion of the vehicle, thereby making it less likely to give a driver or passenger a feeling of insecurity.

Preferably, the vehicle attitude control system of the present invention further comprises a road wheel speed sensor configured to detect a road wheel speed of each of the inner rear road wheel and an outer rear road wheel of the vehicle, wherein the brake control device is configured to set a braking force to be applied to the inner rear road wheel of the vehicle, based on a difference in road wheel speed between the inner rear road wheel and the outer rear road wheel detected by the road wheel speed sensor, and the lateral acceleration of the vehicle.

The uplift of the vehicle body exerts an influence on a ground contact load on the rear road wheels of the vehicle, and, when the inner rear road portion of the vehicle body is lifted up, the difference in road wheel speed between the inner rear road wheel and the outer rear road wheel is changed. According to the above feature, a breaking force to be applied to the inner rear road wheel of the vehicle is set based on the difference in road wheel speed between the inner rear road wheel and the outer rear road wheel, and the lateral acceleration of the vehicle, so that it is possible to more accurately set a braking force for suppressing the uplift of the inner rear portion of the vehicle body.

Preferably, the vehicle attitude control system of the present invention further comprises a vehicle speed sensor configured to detect a vehicle speed of the vehicle, wherein the brake control device is configured to apply a larger braking force to the inner rear road wheel of the vehicle being turning when the vehicle speed detected by the vehicle speed sensor is relatively high than when the vehicle speed detected by the vehicle speed sensor is relatively low.

According to this feature, a larger braking force is applied to the inner rear road wheel of the vehicle being turning, when the vehicle speed is relatively high than when the vehicle speed is relatively low, so that it is possible to appropriately set the braking force according to the vehicle speed.

Preferably, the vehicle attitude control system of the present invention further comprises an accelerator position sensor, wherein the brake control device is configured to apply a larger braking force to the inner rear road wheel of the vehicle being turning when an accelerator position detected by the accelerator position sensor is relatively large than when the accelerator position detected by the accelerator position sensor is relatively small.

According to this feature, a larger braking force is applied to the inner rear road wheel of the vehicle being turning when the accelerator position is relatively large than when the accelerator position is relatively small, so that it is possible to appropriately set the braking force according to the accelerator position.

Preferably, the vehicle attitude control system of the present invention further comprises a steering angle sensor configured to detect a steering angle of a steering wheel of the vehicle, wherein the brake control device is configured to avoid executing the vehicle attitude control, when the steering angle detected by the steering angle sensor according to turning manipulation of the steering wheel is equal to or less than a given value.

According to this feature, when the steering angle according to turning manipulation of the steering wheel is equal to or less than the given value, the vehicle attitude control is not executed, so that it is possible to prevent a situation where intervention of the vehicle attitude control occurs in response to a small steering manipulation at a level unintended by a driver, thereby giving the driver a feeling of strangeness.

Preferably, in the vehicle attitude control system of the present invention, the brake control device is configured to be capable of executing the vehicle attitude control in a low road surface friction mode and in a high road surface friction mode, and wherein the brake control device is configured to generate different braking forces with respect to a same lateral acceleration, in the low road surface friction mode and in the high road surface friction mode, respectively.

The uplift suppression effect based on a braking force to be applied to the inner rear road wheel of the vehicle being turning becomes different depending of the magnitude of the road surface friction. According to the above feature, with respect to the same lateral acceleration, different braking forces are generated, respectively, in the low road surface friction mode and in the high road surface friction mode, so that it is possible to appropriately set the braking force according to the road surface friction.

Preferably, in the vehicle attitude control system of the present invention, the brake control device is configured to be capable of executing the vehicle attitude control in a low road surface friction mode and in a high road surface friction mode, and wherein the brake control device is configured to execute the vehicle attitude control when the lateral acceleration of the vehicle becomes equal to or greater than a first lateral acceleration value in the high road surface friction mode, and to execute the vehicle attitude control when the lateral acceleration of the vehicle becomes equal to or greater than a second lateral acceleration value which is different from the first lateral acceleration value, in the low road surface friction mode.

Depending of the magnitude of the road surface friction, the uplift suppression effect based on a braking force to be applied to the inner rear road wheel of the vehicle being turning becomes different, and the level of the lateral acceleration at which intervention of the vehicle attitude control should be started also becomes different. According to the above feature, in the high road surface friction mode, the vehicle attitude control is executed when the lateral acceleration becomes equal to or greater than the first lateral acceleration value, and, in the low road surface friction mode, the vehicle attitude control is executed when the lateral acceleration becomes equal to or greater than the second lateral acceleration value, so that it is possible to start the execution of the vehicle attitude control at an appropriate timing according to the road surface friction.

Preferably, the vehicle attitude control system of the present invention further comprises a vehicle speed sensor configured to detect a vehicle speed of the vehicle, wherein the brake control device is configured to change a condition for starting the execution of the vehicle attitude control, according to the vehicle speed detected by the vehicle speed sensor.

The uplift suppression effect based on a braking force to be applied to the inner rear road wheel of the vehicle being turning becomes different depending on the vehicle speed. According to the above feature, a condition for starting the execution of the vehicle attitude control is changed according to the vehicle speed, so that it is possible to start the execution of the vehicle attitude control at an appropriate timing according to the vehicle speed.

Preferably, in the vehicle attitude control system of the present invention, the road wheel suspension comprises a link mechanism which suspends an axle portion of each of the rear road wheels with respect to the vehicle body, wherein the link mechanism suspends the axle portion such that the axle portion is swingable about a given suspension center, and wherein the suspension center is located above the axle portion.

According to this feature, the link mechanism suspends the axle portion of each rear road wheel with respect to the vehicle body, such that the axle portion is swingable about a given suspension center. Further, the suspension center is located above the axle portion. Thus, when a braking force is applied to the rear road wheel, a force component pulling the vehicle body downwardly through the link mechanism is increased, so that it is possible to more effectively suppress the uplift of the inner rear portion of the vehicle body.

Preferably, in the vehicle attitude control system of the present invention, the vehicle comprises a mechanical limited slip differential configured to mechanically control a difference in road wheel speed difference between the inner rear road wheel and an outer rear road wheel of the vehicle being turning, according to a torque supplied to each of the inner rear road wheel and the outer rear road wheel, wherein the vehicle attitude control system further comprises an accelerator position sensor, and wherein the brake control device is configured such that the braking force to be applied to the inner rear road wheel of the vehicle being turning becomes smaller as a change rate of an accelerator position detected by the accelerator position sensor becomes larger.

According to this feature, the vehicle comprises the mechanical limited slip differential, so that, based on an function of the limited slip differential, the difference in road wheel speed between the inner rear road wheel and the outer rear road wheel is more rapidly reduced as the acceleration position becomes larger. If the brake control device operates to apply a braking force to the inner rear road wheel based on the vehicle attitude control, in addition to the above action of the limited slip differential, a change in the road wheel speed difference between the inner and outer rear road wheels is likely to excessively increase, thereby giving a driver a feeling of strangeness. According to the above feature, the braking force to be applied to the inner rear road wheel is controlled to become smaller as the change rate of the accelerator position becomes larger, so that it is possible to suppress a feeling of strangeness to be given to the driver.

Preferably, in the vehicle attitude control system of the present invention, the brake control device is configured to generate a same braking force, as long as a same lateral acceleration acts on the vehicle being traveling, irrespective of a road surface friction state of a road surface on which the vehicle is traveling, and the brake control device is configured to avoid the application of the braking force when a difference in road wheel speed between the inner rear road wheel and an outer rear road wheel of the vehicle being turning is equal to or less than a given threshold.

According to this feature, as long as the same lateral acceleration acts on the vehicle being traveling, the same braking force is generated, irrespective of the road surface friction state of the road surface on which the vehicle is traveling, so that it is possible to eliminate a need to change the control according to the road surface friction state and thus simply configure a control algorism. Further, according to the above feature, when the road wheel speed difference is equal to or less than the given threshold, the application of the braking force is avoided, so that it is possible to suppress excessive intervention of a braking force by the brake control device, and, in a situation requiring a braking force, apply an appropriate braking force to suppress the uplift of the inner rear portion of the vehicle being turning.

Effect of Invention

The vehicle attitude control system of the present invention is capable of, even if it used in a vehicle in which a suspension is set such that a roll axis of a vehicle body inclines downwardly in a forward direction, suppressing uplift of an inner rear portion of the vehicle body during turning.

BRIEF DESCRIPTION OF DRAWINGS

FIG. 6 is a flowchart showing the operation of the vehicle attitude control system according to the first embodiment.

FIG. 7 is a flowchart of a subroutine to be called from the flowchart illustrated in FIG. 6.

FIG. 8 is a time chart showing the operation of the vehicle attitude control system according to the first embodiment, during traveling on a normal road surface.

FIG. 9 is a time chart showing the operation of the vehicle attitude control system according to the first embodiment, during traveling on a road surface having a low friction coefficient.

DESCRIPTION OF EMBODIMENTS

With reference to the accompanying drawings, a preferred embodiment of the present invention will now be described.

First of all, with reference to FIG. 1, a vehicle equipped with a vehicle attitude control device according to a first embodiment of the present invention will be described.

Figure 1:
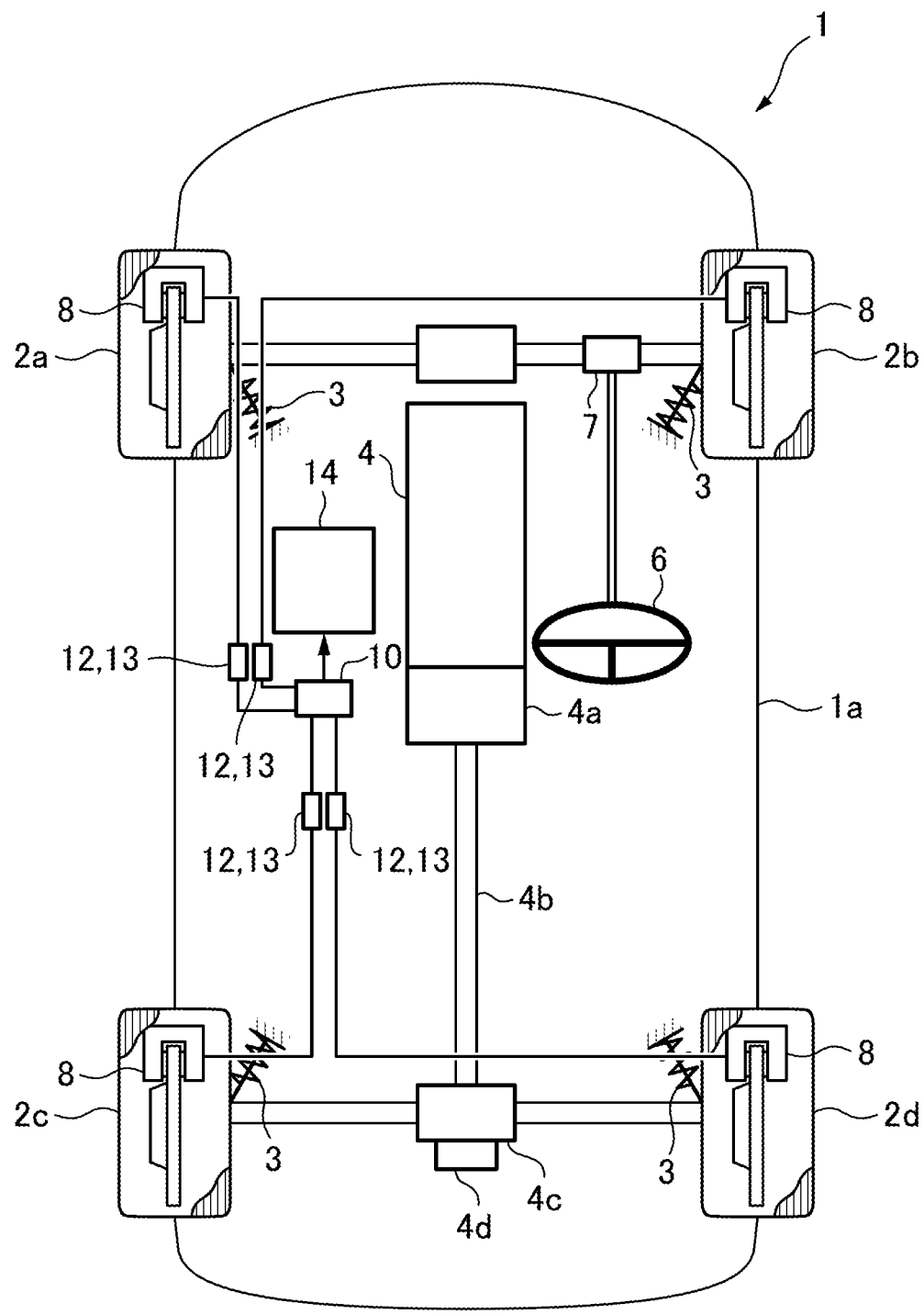
FIG. 1 is a layout diagram showing the overall configuration of a vehicle equipped with a vehicle attitude control system according to a first embodiment of the present invention.

FIG. 1 is a layout diagram showing the overall configuration of the vehicle equipped with the vehicle attitude control system according to the first embodiment.

In FIG. 1, the reference sign 1 denotes the vehicle equipped with the vehicle attitude control system according to this embodiment.

In the vehicle 1, left and right front road wheels 2a, 2b as steerable road wheels are provided in a front portion of a vehicle body 1a thereof, and left and right rear road wheels 2c, 2d as drive road wheels are provided in a rear portion of the vehicle body. Each of the front road wheels 2a, 2b and the rear road wheels 2c, 2d is supported by a suspension unit 3 constituting a road wheel suspension. Further, the vehicle 1 comprises an engine 4 mounted to the front portion of the vehicle body 1a to serve as a prime mover for driving the rear road wheels 2c, 2d. In this embodiment, the engine 4 is a gasoline engine. Alternatively, a different type of internal combustion engine such as a diesel engine, or a motor configured to be driven by electric power, may be used as the prime mover. Further, in this embodiment, the vehicle 1 is a so-called FR vehicle in which the rear road wheels 2c, 2d are driven by the engine 4 mounted to the front portion of the vehicle body 1a via a transmission 4a, a propeller shaft 4b and a differential gear unit 4c. Further, the differential gear unit 4c is preferably equipped with a mechanical limited-slip differential (LSD) 4d. Even in a situation where ground contactability of one of a pair of rear road wheels is deteriorated, the differential gear unit 4c equipped with the mechanical LSD 4d can transmit a certain level of driving force to the other rear road wheel. However, the present invention can be applied to a vehicle having any other drive system, such as a so-called RR vehicle in which rear road wheels are driven by an engine mounted to a rear portion of a vehicle body thereof, or a so-called FF vehicle in which front road wheels are driven by an engine mounted to a front portion of a vehicle body thereof Further, the vehicle 1 is equipped with a steering device 7 for steering the front road wheels 2a, 2b in accordance with turning/turning-back manipulation of a steering wheel 6.

Further, the vehicle 1 comprises a brake control system for supplying a brake hydraulic pressure to a wheel cylinder or a brake caliper (not shown) of a brake unit (in-wheel brake unit) 8 serving as a brake actuator installed in each of the road wheels. The brake control system also comprises a hydraulic pump 10 for producing a brake hydraulic pressure necessary for generating a braking force in each of the in-wheel brake units 8. The hydraulic pump 10 is configured to be driven by electric power supplied from, e.g., a battery (not shown), so as to produce a brake hydraulic pressure necessary for generating a braking force in each of the in-wheel brake units 8, even in a state in which a brake pedal (not shown) is not depressed.

Further, the brake control system comprises four valve units 12 (specifically, solenoid valves) each provided in a respective one of four hydraulic pressure supply lines connected, respectively, to the in-wheel brake units 8, and each configured to control a hydraulic pressure to be supplied from the hydraulic pump 10 to a corresponding one of the in-wheel brake units 8. For example, the degree of valve opening of each of the valve units 12 is changed by adjusting an electric power supply amount from the battery to the valve unit 12. Further, the brake control system comprises four hydraulic pressure sensors 13 each for detecting a hydraulic pressure to be supplied from the hydraulic pump 10 to a respective one of the in-wheel brake units 8. Each of the hydraulic pressure sensors 13 is disposed, e.g., at a connection between a respective one of the valve units 12 and a portion of the hydraulic pressure supply line on a downstream side of the valve unit 12, and configured to detect a hydraulic pressure at a position just downstream of the valve unit 12 and output a detection value to a powertrain control module (PCM) 14.

The brake control system is operable, based on a braking force instruction value and detection values of the hydraulic pressure sensors 13 input from the PCM 14, to calculate hydraulic pressures to be independently supplied, respectively, to the wheel cylinders or brake calipers in the road wheels, and control a pump speed of the hydraulic pump 10 and respective value opening degrees of the valve units 12.

Next, with reference to FIGS. 2 to 4, a suspension structure, and a roll axis of the vehicle body, in the vehicle equipped with the vehicle attitude control system according to this embodiment, will be described.

Figure 2:
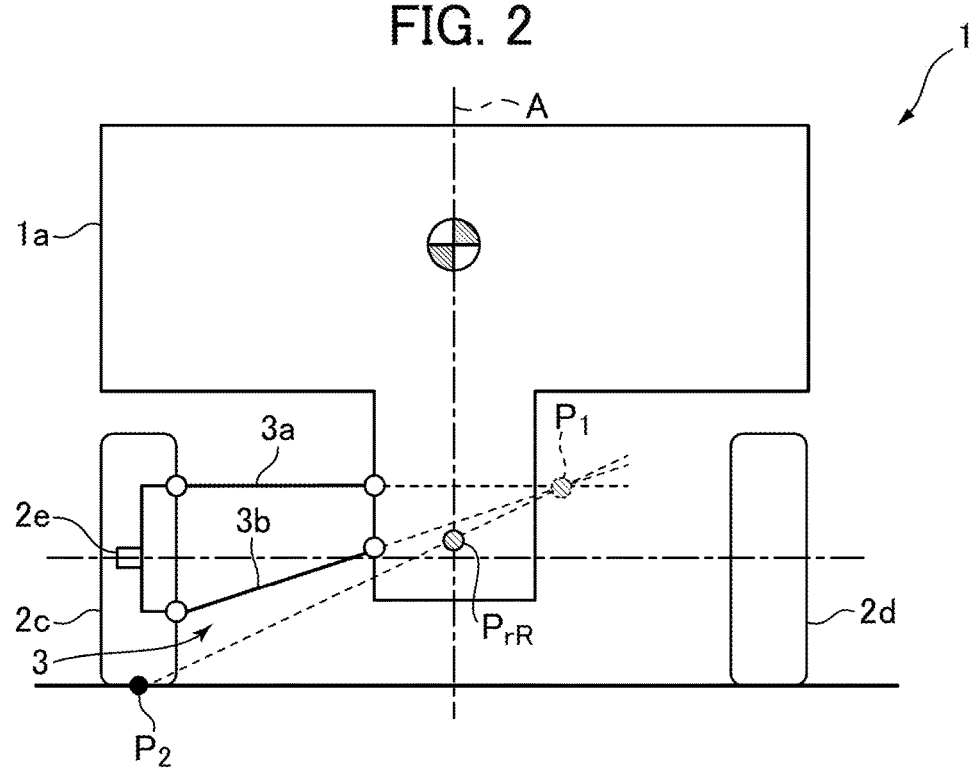
FIG. 2 is a schematic diagram showing a structure for suspending an axle portion of each rear road wheel with respect to a vehicle body of the vehicle equipped with the vehicle attitude control system according to the first embodiment, when viewed from behind the vehicle.

FIG. 2 is a schematic diagram showing a structure for suspending an axle portion of each of the rear road wheels 2c, 2d with respect to the vehicle body 1a of the vehicle 1, when viewed from behind the vehicle 1. FIG. 3 is a schematic diagram showing a roll axis of the vehicle body of the vehicle equipped with the vehicle attitude control system according to this embodiment. FIG. 4 is a schematic explanatory diagram of a force acting on the vehicle body when a braking force is applied to the rear road wheels of the vehicle.

As shown in FIG. 2, an axle portion 2e of the left rear road wheel 2c of the vehicle 1 is supported by the suspension unit 3 with respect to the vehicle body 1a of the vehicle 1a. Specifically, in the example illustrated in FIG. 2, the axle portion 2e of the rear road wheel 2c is supported by an upper arm 3a and a lower arm 3b which constitute a link mechanism of the suspension unit 3. Respective extended lines of the upper arm 3a and the lower arm 3b each connecting the rear road wheel 2c and the vehicle body 1a together intersect at an intersection point $P_1$. A straight line connecting the intersection point $P_1$ and a ground contact point $P_2$ of the rear road wheel 2c intersects with a central axis A of the vehicle body 1a at a point $P_{rR}$ (the central axis A corresponds to an upward-downward directional plane including a longitudinal central axis of the vehicle body 1a). This point $P_{rR}$ is the center of rolling motion (roll center) in the rear portion of the vehicle body 1a, i.e., the rear portion of the vehicle body 1a undergoes the rolling motion about point $P_{rR}$. Here, the vehicle 1 is bilaterally symmetric. Thus, in a case where the center of the rolling motion is determined with regard to the right rear road wheel 2d, the same point $P_{rR}$ is determined as the center of the rolling motion. Further, with regard to the suspension unit 3 suspending each of the front road wheels 2a, 2b of the vehicle 1, the center $P_{rF}$ of the rolling motion can be determined in the same manner.

Figure 3:
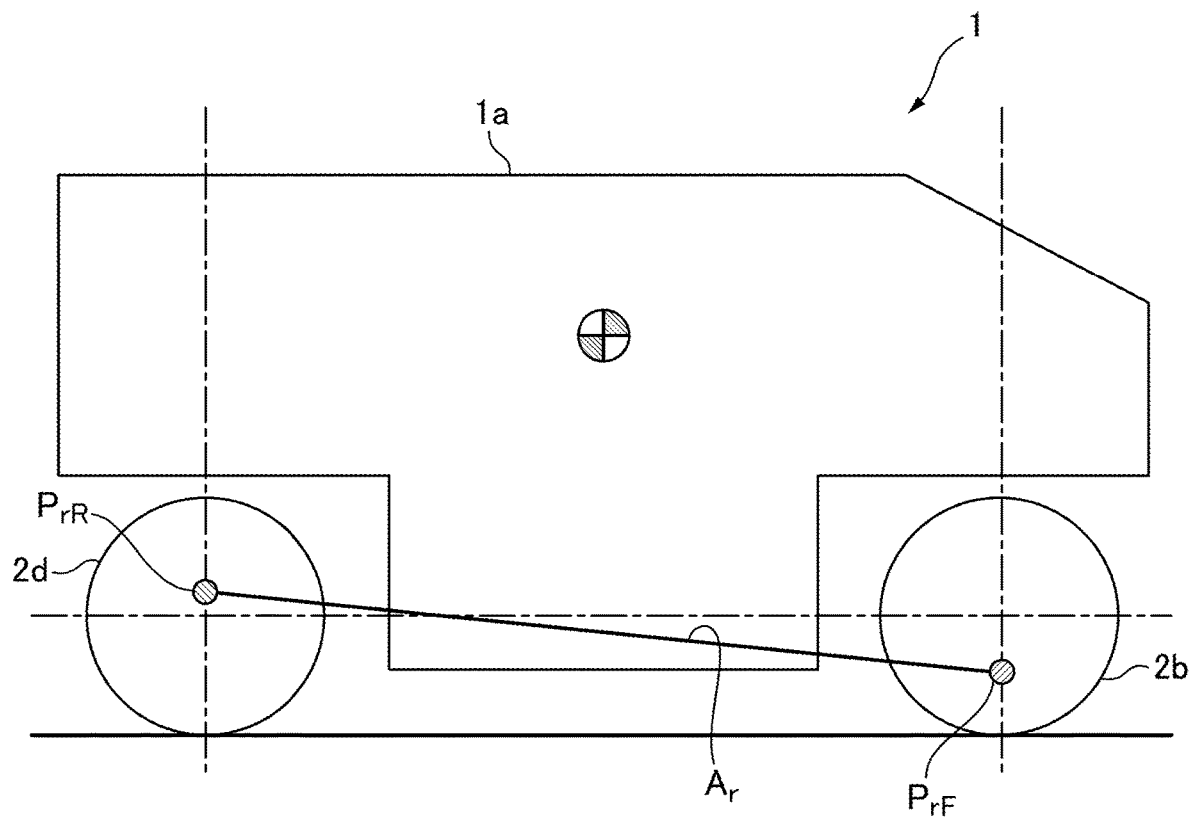
FIG. 3 is a schematic diagram showing a roll axis of the vehicle body of the vehicle equipped with the vehicle attitude control system according to the first embodiment.

FIG. 3 is a schematic diagram showing respective projected points of the center $P_{rR}$ of the rolling motion in the rear portion of the vehicle body 1a, and the center $P_{rF}$ of the rolling motion in the front portion of the vehicle body 1a, when viewed laterally inwardly from outside the vehicle 1. An axis $A_r$ connecting the center $P_{rR}$ of the rolling motion in the rear portion of the vehicle body 1a and the center $P_{rF}$ of the rolling motion in the front portion of the vehicle body 1a is defined as a central axis during the rolling motion of the vehicle body 1a. Thus, basically, the vehicle body 1a of the vehicle 1 undergoes the rolling motion about the roll axis $A_r$. Further, in this embodiment, the roll axis $A_r$ of the vehicle 1 inclines downwardly in a forward direction of the vehicle, i.e., inclined such that a front end of the vehicle 1 is sunk down, as shown in FIG. 3. As above, the roll axis $A_r$ of the vehicle 1 is set to incline downwardly in the forward direction, so that it is possible to naturally produce an appropriate diagonal rolling motion during turning of the vehicle 1, thereby improving turning performance of the vehicle 1.

Next, with reference to FIG. 4, a force acting of the vehicle body 1a when a braking force is applied to the rear road wheels 2c, 2d of the vehicle 1 will be described.

As mentioned above, each of the rear road wheels 2c, 2d is suspended by the upper arm 3a and the lower arm 3b constituting the suspension unit 3. A road wheel is likely to be suspended by various types of suspensions. However, in each case, an axle portion of the road wheel can be deemed to be suspended such that the axle portion is swingable about a given virtual suspension center.

Figure 4:
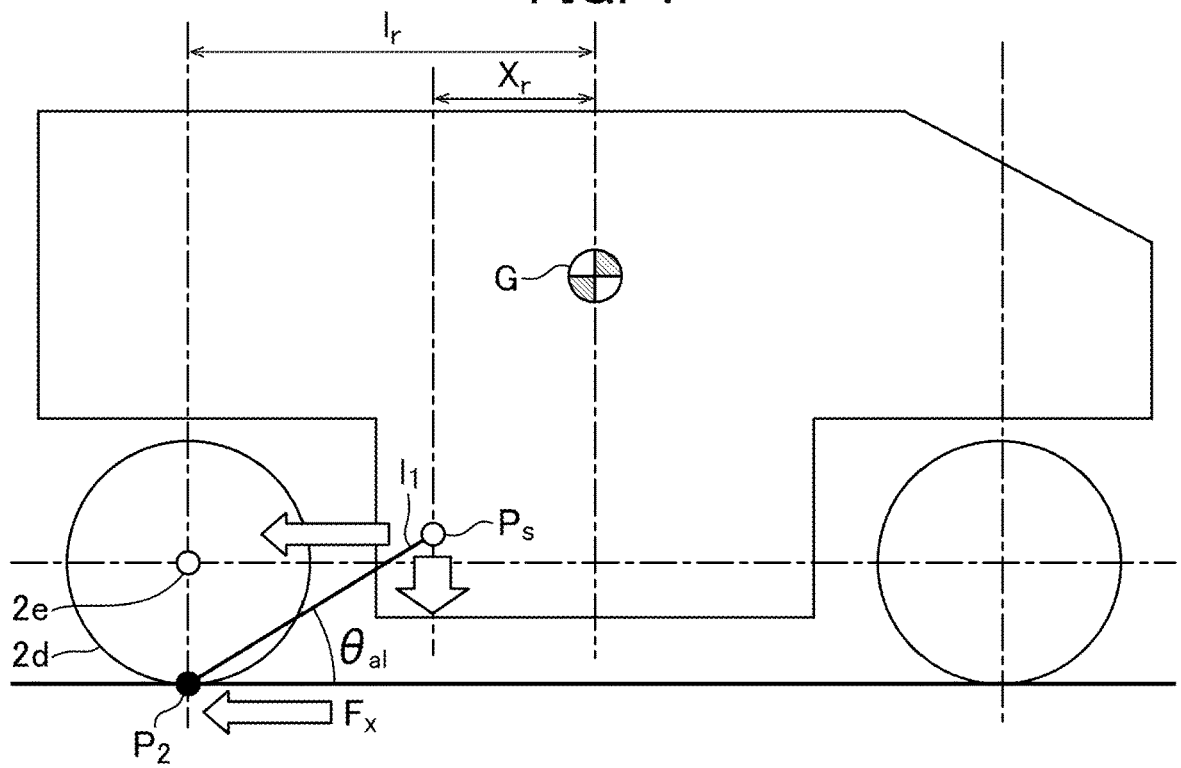
FIG. 4 is a schematic explanatory diagram of a force acting on the vehicle body when a braking force is applied to the rear road wheels of the vehicle equipped with the vehicle attitude control system according to the first embodiment.

In this embodiment, the rear road wheel 2d is suspended such that the rear road wheel 2d is swingable about a suspension center $P_S$, as shown in FIG. 4. In this embodiment, this suspension center $P_S$ is located above the axle portion 2e of the rear road wheel 2d.

Here, when a braking force is applied to the rear road wheel 2d, the rear road wheel 2d pulls the vehicle body 1a back along a segment $l_1$ connecting the ground contact point $P_2$ of the rear road wheel 2d with respect to a road surface, and the suspension center $P_S$. Assuming that an angle between the segment $l_1$ and the road surface is $\theta_{al}$, and a friction force acting between the road surface and the rear road wheel 2d is $F_x$, a force component pulling the vehicle body 1a downwardly can be calculated as follows:

$$F_x \times \tan \theta_{al}.$$

Further, assuming that the horizontal distance between the gravity center G of the vehicle 1 and the axel portion 2e of the rear road wheel 2d is $l_r$, and a horizontal distance between the gravity center G of the vehicle 1 and the suspension center $P_S$, a moment $M_{al}$ pulling the rear portion of the vehicle body 1a downwardly can be calculated by the following formula (1).

$$M_{al} = (l_r - X_r) \times F_x \times \tan \theta_{al} \quad (1)$$

As above, by applying a braking force to the rear road wheel 2c or 2d of the vehicle 1, it is possible to pull the rear portion of the vehicle body 1a downwardly. In addition, in this embodiment, the suspension center $P_S$ is located at a position higher than that of the axle portion 2e of the rear road wheel, so that the force pulling the vehicle body 1a downwardly becomes relatively large.

Next, with reference to FIG. 5, various sensors equipped in the vehicle 1 will be described.

Figure 5:
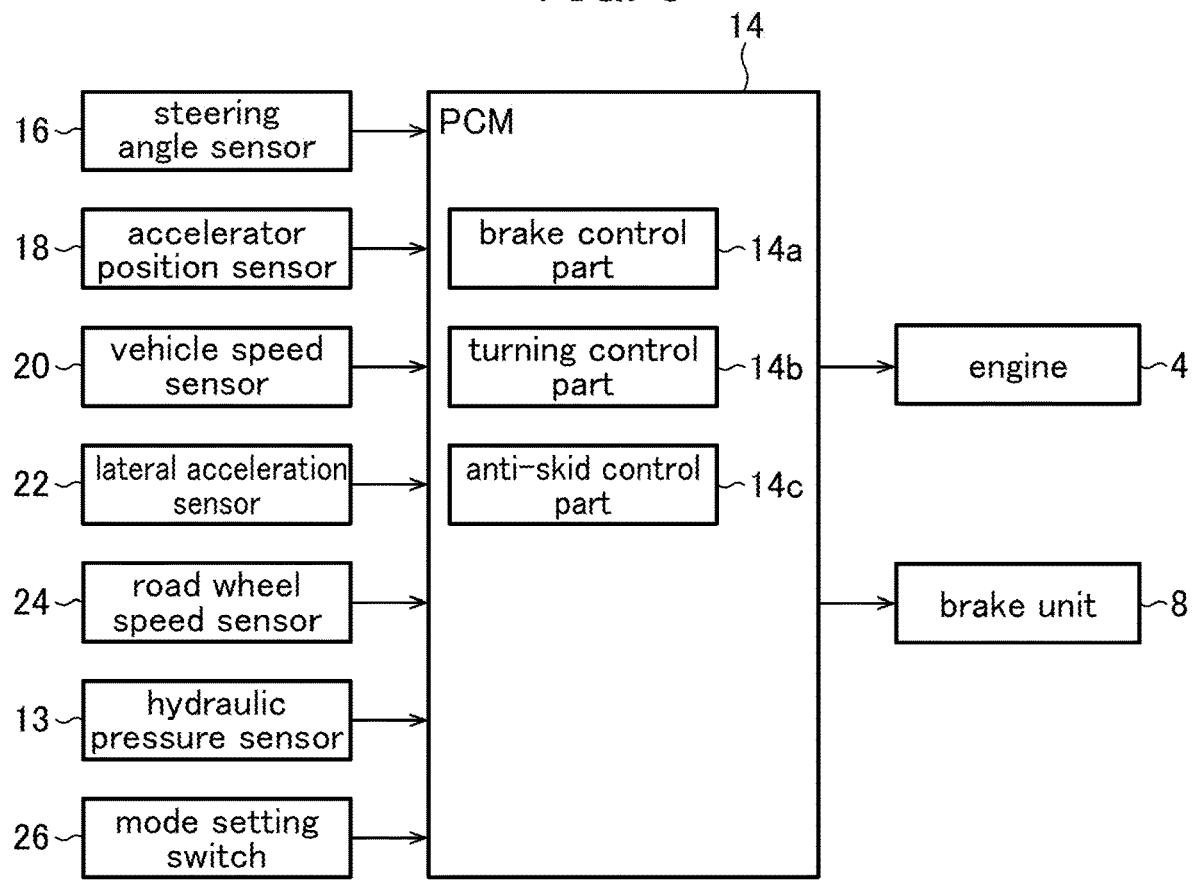
FIG. 5 is a block diagram showing a PCM, sensors, etc., equipped in the vehicle attitude control system according to the first embodiment.

FIG. 5 is a block diagram showing the PCM, sensors connected to the PCM, etc., equipped in the vehicle 1

As shown in FIG. 5, the vehicle 1 is equipped with: a steering angle sensor 16 for detecting a turning angle of the steering wheel 6 (steering angle); an accelerator position sensor 18 for detecting a depression amount (relative position) of an accelerator pedal; and a vehicle speed sensor 20 for detecting a vehicle speed. Detection signals from these sensors are input to the PCM 14. Further, the vehicle 1 is equipped with: a lateral acceleration sensor 22 for detecting a lateral acceleration acting on the vehicle 1; four road wheel speed sensors 24 each for detecting a road wheel speed of a respective one of the road wheels of the vehicle 1; and the hydraulic pressure sensors 13 each for detecting the hydraulic pressure on the downstream side of a respective one of the valve units 12 (FIG. 1). Detection signals from these sensors are also input to the PCM 14. In this embodiment, as lateral acceleration sensor 22, a sensor configured to directly measure the lateral acceleration is equipped in the vehicle 1. However, the sensor configured to directly measure the lateral acceleration needs not necessarily be used as the lateral acceleration sensor 22, but the lateral acceleration may be calculated from a detection value measured by another sensor. As used in this specification, the term "lateral acceleration sensor" includes any sensor usable for determining the lateral acceleration.

The vehicle 1 is configured to allow a driver to select a low road surface friction mode or a high road surface friction mode, in conformity to a state of a road surface on which the vehicle of the driver is traveling, and provided with a mode setting switch 26 for selecting one of the modes. When the driver uses the mode setting switch 26 to select the low road surface friction mode or the high road surface friction mode in conformity to the road surface state, this setting is input to the PCM 14 to execute vehicle attitude control in conformity to the road surface state, as described later.

The PCM 14 internally comprises: a brake control part 14a to control the brake units 8 to serve as a brake control device; a turning control part 14b to execute turning control for improving the turning performance of the vehicle 1; and an anti-skid control part 14c to execute anti-skid control for suppressing a skid during turning of the vehicle 1. Each of the control parts 14a, 14b, 14c is configured to send a control signal to the engine 4 or the brake units 8 to execute a corresponding one of the vehicle attitude control, the turning control and the anti-skid control.

The vehicle attitude control system according to the first embodiment comprises: the steering angle sensor 16, the accelerator position sensor 18, the vehicle speed sensor 20, the lateral acceleration sensor 22, the road wheel speed sensor 24 and the mode setting switch 26 each sending a signal to the PCM 14; the brake control part 14a, the turning control part 14b and the anti-skid control part 14c each internally comprised in the PCM 14; and the engine 4 and the brake units 8 to be controlled by the PCM 14. It should be noted here that the above elements constituting the vehicle attitude control system may be partly omitted according to an intended application.

The control parts of the PCM 14 are composed of a computer which comprises: a CPU; various programs (including a basic control program such as an OS, and an application program capable of being activated on the OS to realize a specific function) to be interpreted and executed by the CPU; and an internal memory such as a ROM or a RAM for storing therein the programs and a variety of data (the above components are not shown in the figures).

Next, with reference to FIGS. 6 to 19, the operation of the vehicle attitude control system according to the first embodiment will be described.

FIG. 6 is a flowchart showing the operation of the vehicle attitude control system. FIG. 7 is a flowchart of a subroutine to be called from the flowchart illustrated in FIG. 6. FIG. 8 is a time chart showing the operation of the vehicle attitude control system during traveling on a normal road surface. FIG. 9 is a time chart showing the operation of the vehicle attitude control system during traveling on a road surface having a low friction coefficient. FIGS. 10 to 19 are maps for use in setting a vehicle attitude control instruction value in the vehicle attitude control system.

The flowchart illustrated in FIG. 6 is repeatedly executed mainly in the PCM 14 at given time intervals, so as to automatically apply a braking force to the vehicle 1.

First of all, in step S1 of FIG. 6, detection signals of various sensors are read from the sensors into the PCM 14. The detection signals read in the step S1 are used in processings in steps S2 to S4. Specifically, in the step S1, a signal of the steering angle (turning angle of the steering wheel) [deg] from the steering angle sensor 16, a signal of the accelerator position [%] from the accelerator position sensor 18, and a signal of the vehicle speed [km/h] from the vehicle speed sensor 20, are read. Further, in the step S1, a signal of the lateral acceleration [G] from the lateral acceleration sensor 22, a signal of the road wheel speed [m/sec] from each of the road wheel speed sensors 24 and a signal of the brake hydraulic pressure [MPa] from each of the hydraulic pressure sensors 13 are read. Further, a selection signal indicative of which of the low road surface friction mode and the high road surface friction mode is currently selected by a driver is read from the mode setting switch 26.

Subsequently, in step S2, processing of setting an instruction value for the vehicle attitude control is executed. Specifically, during turning of the vehicle 1 based on turning manipulation of the steering wheel 6 of the vehicle 1, as the vehicle attitude control, a braking force is applied to an inner rear road wheel of the vehicle 1 being turning, so as to suppress uplift of an inner rear portion of the vehicle body 1a of the vehicle being turning. For example, in FIG. 1, when the vehicle 1 turns leftwardly, a braking force is applied to the left rear road wheel 2c, thereby suppressing uplift of a left rear portion of the vehicle body 1a. In the step S2, the flowchart illustrated in FIG. 7 is called as a subroutine to set an instruction value of a braking force to be applied to the inner rear road wheel for the purpose of the vehicle attitude control. This vehicle attitude control is executed in a range in which the lateral acceleration during turning of the vehicle 1 is relatively low, and is configured to apply a relatively small first braking force to the inner rear road wheel, based on a difference in road wheel speed between the inner rear road wheel and an outer rear road wheel.

Preferably, a braking force to be applied to the vehicle 1 having a mass of about 960 kg to about 1060 kg for the purpose of the vehicle attitude control is produced by applying a hydraulic pressure of 0.02 MPa to 0.1 MPa from the hydraulic pump 10 to the brake unit 8 of the inner rear road wheel. Thus, even in a situation where, during turning of the vehicle 1, the inner rear portion of the vehicle 1a is apt to be lifted up. However, by applying the braking force set as mentioned above, a relatively small acceleration in the upward-downward direction, which is equal to or less than the given value, is applied to the vehicle body 1a, and the uplift of the inner rear portion of the vehicle body is suppressed.

Subsequently, in step S3, processing of setting an instruction value for the turning control is executed. The turning control is intended to improve the turning performance of the vehicle 1, and is executed by the turning control part 14b of the PCM 14 when a steering angular speed of the steering wheel 6 becomes equal to or greater than a given value. Further, the turning control is configured to adjust a torque to be generated by the engine 4, and/or apply a braking force to the vehicle 1 by the brake unit 8. Specifically, in the case where a braking force is to the vehicle 1 during the turning control, a braking force is applied to the inner rear road wheel of the vehicle 1 being turning, thereby generating a yaw moment in a turning direction of the vehicle 1 to improve the turning performance of the vehicle 1.

In the vehicle attitude control whose instruction value is set in the step S2, a braking force is also applied to the inner rear road wheel of the vehicle 1 being turning. However, the turning control is intended to be executed in a range in which the lateral acceleration is relatively high as compared to that in the vehicle attitude control, and is configured to apply a larger braking force than that in the vehicle attitude control, to the vehicle 1. That is, the vehicle attitude control is completely different from the turning control, in that the vehicle attitude control is executed for the purpose of suppressing the uplift of the inner rear portion of the vehicle body 1a during turning of the vehicle 1, whereas the turning control is executed for the purpose of applying the yaw moment to the vehicle 1 to improve the turning performance. In this embodiment, a braking force to be applied for the turning control is generated by applying a hydraulic pressure of 0.2 MPa to 0.5 MPa, which is greater than that for the vehicle attitude control, from the hydraulic pump 10 to the brake unit 8 of the inner rear road wheel.

Subsequently, in step S4, processing of setting an instruction value for the anti-skid control is executed. The anti-skid control is control to be executed by the anti-skid control part 14c of the PCM 14 for the purpose of suppressing or preventing a situation where the vehicle 1 skids during turning. This anti-skid control is control to be executed based on the steering angle of the steering wheel 6, and the lateral acceleration of the vehicle 1, and executed in a range in which the lateral acceleration is significantly greater than that in the turning control. In the anti-skid control, in order to return a traveling state of the vehicle 1 to a turning state intended by a driver, an appropriate braking force is applied to each of the road wheels of the vehicle 1. A braking force to be applied in the anti-skid control is set to be significantly greater than that in the turning control. In this embodiment, a braking force to be applied for the anti-skid control is generated by applying a hydraulic pressure of 20 MPa or more, which is greater than that for the turning control, from the hydraulic pump 10 to each of the brake units 8.

Subsequently, in step S5, a control signal based on the instruction value set in one of the steps S2 to S4 is transmitted to the brake unit(s) 8 to apply a braking force to the vehicle 1, and then one cycle of the processing routine of the flowchart illustrated in FIG. 6 is completed. It should be noted here that the vehicle attitude control, the turning control and the anti-skid control are executed, respectively, in different traveling states, and thereby not normally executed in an overlapped manner, although all the controls are configured to apply a braking force to the vehicle 1.

Next, with reference to FIGS. 7 to 19, the vehicle attitude control instruction value setting processing will be described in detail.

As mentioned above, the flowchart illustrated in FIG. 7 is a subroutine to be called from the step S2 of the flowchart in FIG. 6, and executed by the brake control part 14a of the PCM 14. Further, FIGS. 8 and 9 are time charts each showing an example of a braking force generated when the vehicle attitude control is executed. FIG. 8 shows a time chart in a state in which the vehicle 1 is traveling on a normal road surface (high friction road surface), and FIG. 9 shows a time chart in a state in which the vehicle 1 is traveling on a low friction road surface. In the time charts illustrated in FIGS. 8 and 9, the horizontal axis represents time, and the vertical axis represents a detection value of the steering angle sensor 16, a detection value of the accelerator position sensor 18, the road wheel speed of the rear road wheel detected by the road wheel speed sensors 24, and a control instruction value for a braking force to be applied to the inner rear road wheel, which are arranged in this order from top down.

First of all, in step S11 in FIG. 7, a difference in road wheel speed between the left and right rear road wheels 2c, 2d of the vehicle 1 is calculated. Specifically, the road wheel speed difference between the left and right rear road wheels 2c, 2d is calculated based on respective road wheel speeds of the road wheels read from the road wheel speed sensors 24 in the step S1 of FIG. 6.

Subsequently, in step S12, it is determined whether or not a "vehicle attitude control flag" is "True". The "vehicle attitude control flag" is a flag configured to be changed to "True" when the vehicle 1 starts turning, and the vehicle attitude control is stated based on a given condition and to be returned to "False" when the steering wheel 6 in a turned state is turned back, and the turning is completed. In the example of the time chart illustrated in FIG. 8, at time to, the vehicle 2 does not start turning. Thus, the "vehicle attitude control flag" is "False", and the processing subroutine of the flowchart in FIG. 7 proceeds to step S16.

In the step S16, the inner rear road wheel and the outer rear road wheel of the vehicle being turning are compared in terms of the road wheel speed. When the road wheel speed of the outer rear road wheel is determined to be greater than that of the inner rear road wheel, the processing subroutine proceeds to step S17. On the other hand, when the road wheel speed of the inner rear road wheel is determined to be equal to or greater than that of the outer rear road wheel, the processing subroutine proceeds to step S21. In a state in which no slip occurs in the rear road wheels, the road wheel speed of the outer rear road wheel is greater than that of the inner rear road wheel. However, this relationship is reversed when a certain level of slip occurs in the inner rear road wheel. In the example illustrated in FIG. 8, after the turning manipulation of the steering wheel 6 by a driver is started at time $t_1$ to cause the vehicle 1 to start turning, the road wheel speed of the outer rear road wheel is greater than that of the inner rear road wheel, so that the processing subroutine of the flowchart in FIG. 7 proceeds to the step S17.

In the step S17, it is determined whether or not the road wheel speed difference between the outer rear road wheel and the inner rear road wheel (the outer rear road wheel speed—the inner rear road wheel speed) is greater than a first road wheel speed difference threshold $T_a$ [m/sec] which is a threshold of the road wheel speed difference. When the difference between the outer rear and inner rear road wheel speeds is determined to be equal to or less than first road wheel speed difference threshold $T_a$, processings in step S23 and subsequent steps are executed, and then one cycle of the processing subroutine of the flowchart illustrated in FIG. 7 is completed without performing the application of the first braking force based on the vehicle attitude control. Specifically, the road wheel speed difference between the left and light rear road wheels is likely to occur due to errors in the road wheel speed sensors 24. Thus, if the vehicle attitude control is permitted to intervene, under the condition of a small road wheel speed difference, there is a possibility of giving a driver a feeling of strangeness. Therefore, in a situation where the road wheel speed difference is small, the vehicle attitude control is not executed. Here, the first road wheel speed difference threshold $T_a$ [m/sec] which is a threshold of the road wheel speed difference is changed according to the vehicle speed of the vehicle 1. Setting of a specific value of the first road wheel speed difference threshold will be described later with reference to FIG. 10.

In the example illustrated in FIG. 8, when the driver performs the turning manipulation of the steering wheel 6 at the time $t_1$ to cause the vehicle 1 to start turning, the road wheel speed difference gradually increases. Then, when the road wheel speed difference exceeds the road wheel speed difference $T_a$, processings in step S18 and subsequent steps will be executed.

In the step S18, it is determined whether or not the lateral acceleration detected by the lateral acceleration sensor 22 is greater than a first lateral acceleration threshold GYa [G] (1 G=9.81 m/sec$^2$), and the vehicle speed detected by the vehicle speed sensor 20 is greater than a first vehicle speed threshold Va [km/h]. When it is determined that the lateral acceleration is equal to or less than the first lateral acceleration threshold $GY_a$, or the vehicle speed is equal to or less than the first vehicle speed threshold $V_a$, the processings of the step S23 and the subsequent steps are executed, and then one cycle of the processing subroutine of the flowchart illustrated in FIG. 7 is completed without performing the application of the first braking force based on the vehicle attitude control. Specifically, in a state in which the lateral acceleration or the vehicle speed is significantly low, there is a low need for intervention of the vehicle attitude control, and an unnecessary control intervention is likely to give the driver a feeling of strangeness. Therefore, in such a state, the vehicle attitude control is not executed.

On the other hand, when it is determined that the lateral acceleration is greater than the first lateral acceleration threshold $GY_a$, or the vehicle speed is greater than the first vehicle speed threshold $V_a$, the processings of the step S19 and the subsequent steps are executed to apply the first braking force based on the vehicle attitude control. In the step S19, the vehicle attitude control flag is changed to "True". Here, when the vehicle attitude control flag is changed to "True" in the step S19, the processing subroutine of the flowchart in FIG. 7 proceeds from the step S12 to the step S13. In the example illustrated in FIG. 8, the high road surface friction mode is set through the mode setting switch 26. Thus, the processing subroutine of the flowchart illustrated in FIG. 7 proceeds from the step S13 to the step S16, so that processings of steps S14 and S15 are not executed.

Subsequently, in step S20, a basic instruction value $F_{b1}$ [N] for the vehicle attitude control is set based on the road wheel speed difference between the left and right rear road wheels. Specifically, a braking force to be applied to the inner rear road wheel of the vehicle 1 being turning, based on the road wheel speed difference between the inner and outer rear road wheels. This basic instruction value $F_{b1}$ is an instruction value of a braking force to be applied to the inner rear road wheel of the vehicle 1 being turning, and is calculated by multiplying a difference between an outer road wheel speed $V_o$ and an inner road wheel speed $V_i$ by a given coefficient $C_{m1}$, as expressed in the following formula (2).

$$F_{b1}=c_{m1}\times(V_o-V_i) \qquad (2)$$

Subsequently, in step S25, the basic instruction value $F_{b1}$ calculated in the step S20 is multiplied by various gains, thereby setting a final instruction value $F_1$ for the vehicle attitude control. Specific processing to be executed in the step S25 will be described later. Then, in step S26, instruction values calculated for various controls are compared with each other, and a largest one of the instruction values is selected as a final instruction value.

Specifically, in the flowchart illustrated in FIG. 7, in addition to the first braking force based on the vehicle attitude control to be calculated in the step S20, a lower limit braking force based on pre-brake limited slip differential (pre-brake LSD) control, and a second braking force based on brake limited slip differential (brake LSD) control, are calculated, respectively, in the step S15 and step S22, as mentioned later. After a largest one of the calculated braking is selected in the step S26, one cycle of the processing subroutine of the flowchart illustrated in FIG. 7 is completed. Upon completion of the processing subroutine of the flowchart in FIG. 7, the processing routine proceeds to the step S5. In the step S5, the brake control system is controlled such that the selected braking force is applied to the brake unit 8 of the inner rear road wheel.

In the example illustrated in FIG. 8, after the turning manipulation of the steering wheel 6 is started at the time $t_1$, the difference in road wheel speed between the outer rear and inner rear road wheels gradually increases, and thereby the basic braking force instruction value calculated by the formula (2) gradually increases. Therefore, a braking force to be applied to the inner rear road wheel of the vehicle 1 being turning also gradually increases (time $t_1$ to time $t_2$ in FIG. 8). Then, at the time $t_2$ in FIG. 8, the driver starts to depress the accelerator pedal, and, accordingly, the road wheel speed difference between the left and right rear road wheels becomes constant (time $t_2$ to time $t_3$ in FIG. 8). During this period, the basic braking force instruction value calculated by the formula (2) also becomes constant while being maintained at a maximum value Subsequently, when the driver stops the turning manipulation of the steering wheel 6 at the time $t_3$ in FIG. 8 to hold the steering angle, the vehicle 1 enters a steady turning state. Accordingly, the road wheel speed in each of the inner and outer rear road wheels gradually rises, and the road wheel speed difference between the inner and outer rear road wheels gradually decreases (time $t_3$ to time $t_4$ in FIG. 8). Therefore, the basic braking force instruction value calculated by the formula (2) also gradually decreases. Then, at the time $t_4$ in FIG. 8, the road wheel speed difference between the inner and outer rear road wheels becomes equal to or less than the first road wheel speed difference threshold $T_a$. Thus, the processing subroutine of the flowchart in FIG. 7 proceeds from the step S17 to the step S23, so that the instruction value for the vehicle attitude control becomes zero.

Then, at time $t_5$ in FIG. 8, slip of the inner rear road wheel increases, and the relationship regarding the road wheel speed between the inner and outer road wheels is reversed, i.e., the road wheel speed of the inner rear road wheel becomes greater than that of the outer rear road wheel. Thus, the processing subroutine of the flowchart in FIG. 7 proceeds from the step S16 to the step S21, and the processings of the step S21 and the subsequent steps will be executed.

In the step S21, it is determined whether or not the road wheel speed difference between the inner rear road wheel and the outer rear road wheel (the inner rear road wheel speed–the outer rear road wheel speed) is greater than a second road wheel speed difference threshold $T_b$ [m/sec]. When the difference between the outer rear and inner rear road wheel speeds is determined to be equal to or less than second road wheel speed difference threshold $T_b$, processings in step S23 and subsequent steps are executed, and then one cycle of the processing subroutine of the flowchart illustrated in FIG. 7 is completed without applying the second braking force based on brake LSD control. Specifically, the road wheel speed difference between the left and right rear road wheels is likely to occur due to errors in the road wheel speed sensors 24. Thus, if the brake LSD control is permitted to intervene, under the condition of a small road wheel speed difference, there is a possibility of giving a driver a feeling of strangeness. Therefore, in a situation where the road wheel speed difference is small, the brake LSD control is not executed.

On the other hand, when the road wheel speed difference between the outer rear and inner rear road wheels is determined to be greater than second road wheel speed difference threshold $T_b$, the processing subroutine proceeds to the step S22, and, in the step S22, a basic instruction value of a second braking force for the brake LSD control is calculated. As above, the brake control part 14*a* is operable, when the road wheel speed of the inner rear road wheel of the vehicle 1 becomes greater than that of the outer rear road wheel of the vehicle 1, to apply the second braking force to the inner rear road wheel. Here, the brake LSD control is control of applying a brake to a road wheel being slipping to reduce the road wheel speed thereof, thereby avoiding such a slip state. Specifically, in a state in which the road wheel speed of an inner drive wheel (in this embodiment, the inner rear road wheel) of a vehicle 1 being turning is greater than that of an outer drive wheel of the vehicle 1 as in the period from the time $t_5$ to time $t_6$ in FIG. 8, the inner drive wheel starts slipping. When the road wheel speed difference increases due to the slip of the inner rear road wheel, a driving force becomes unable to be transmitted to the outer rear road wheel via the differential gear unit 4*c*. Thus, a braking force is applied to the inner rear road wheel to reduce the road wheel speed of the inner rear road wheel.

In the step S22, a basic instruction value $F_{b2}$ [N] for the brake LSD control is set based on the road wheel speed difference between the left and right rear road wheels. This basic instruction value $F_{b2}$ of the second braking force for the brake LSD control is an instruction value of a braking force to be applied to the inner rear road wheel of the vehicle 1 being turning, and is calculated by multiplying a difference between the inner road wheel speed $V_i$ and the outer road wheel speed $V_o$ by a given coefficient $C_{m2}$, as expressed in the following formula (3).

$$F_{b2}=C_{m2}\times(V_i-V_o) \qquad (3)$$

In the example illustrated in FIG. 8, at the time $t_5$, the application of the second braking force based on the brake LSD control is started, and thereby the road wheel speed of the inner rear road wheel is reduced. Then, at the time $t_6$, the road wheel speed difference between the inner and outer rear road wheels becomes approximately zero. After the road wheel speed difference becomes approximately zero at the time $t_6$, the processing subroutine of the flowchart in FIG. 7 proceeds as follows: the step S16→S21→S23, or the step S16→S17→S23, so that no braking force is applied to the inner rear road wheel (time $t_6$ to time $t_7$ in FIG. 8).

In the example illustrated in FIG. 8, the driver starts turning-back manipulation of the steering wheel 6 from the time $t_6$, and completes the turning-back manipulation at the time $t_7$, so that the turning of the vehicle 1 is completed to allow the vehicle 1 to travel straight ahead again.

Specifically, in the step S23, it is determined, based on a detection value of the steering angle sensor 16, whether or not the turning-back manipulation of the steering wheel 6 has been completed. When the turning-back manipulation is determined not to have been completed, the processing subroutine proceeds to the step S25. On the other hand, when the turning-back manipulation is determined to have been completed, the processing subroutine proceeds to step S24. In this embodiment, during a period after start of the turning manipulation of the steering wheel 6 at the time $t_1$ in FIG. 8 through until the turning-back manipulation of the steering wheel 6 is completed at the time $t_7$ in FIG. 8, in the vehicle attitude control, the brake control part 14a is operable to generate a braking force by a brake hydraulic pressure of about 0.1 MPa or less.

When it is determined that the turning-back manipulation has been completed, i.e., the turning of the vehicle 1 has been completed, the "vehicle attitude control flag" is changed to "False" in the step S24. Subsequently, when the processing subroutine of the flowchart illustrated in FIG. 7 is executed, it will proceed from the step S12 to the step S16. As long as this state is continued, the lower limit braking force based on the pre-brake LSD control is never applied, even in a situation where the low road surface friction mode is set through the mode setting switch 26.

Next, with reference to FIG. 9, the operation of the vehicle attitude control system in the situation where the low road surface friction mode is set through the mode setting switch 26 will be described.

The time chart illustrated in FIG. 9 shows one example of the vehicle attitude control in the situation where the low road surface friction mode is set. The time chart in FIG. 9 is different from the time chart in FIG. 8, in that, in the situation where the low road surface friction mode is set, processings of the step S14 and the subsequent steps are executed in the flowchart illustrated in FIG. 7. In the processings of the step S14 and the subsequent steps, the lower limit braking force based on the pre-brake LSD control is calculated. In the time chart illustrated in FIG. 9, the instruction value for the vehicle attitude control is indicated by the solid line. Further, the instruction value for the pre-brake LSD control is indicated by the broken line In this embodiment, the low road surface friction mode and the high road surface friction mode are switched therebetween according to the manual setting of the mode setting switch 26 by the driver. However, as one modification, the vehicle attitude control system of the present invention may be configured such that the two modes are automatically switched therebetween, in addition to or instead of the manual setting of the mode setting switch 26. For example, the brake control part 14a may be configured to estimate a friction coefficient of a road surface, based on an outside air temperature sensor and/or a rainfall sensor installed in the vehicle 1, an operating state of a windshield wiper, a slip state of the drive road wheels, etc., and, when the estimated friction coefficient is equal to or less than a given value, automatically set the low road surface friction mode. In this case, the brake control part 14a also functions as a friction coefficient estimation part to estimate a friction coefficient of a road surface on which the vehicle 1 is traveling.

First of all, when the driver starts the turning manipulation of the steering wheel 6 at time $t_{11}$ in FIG. 9, a difference in road wheel speed between the inner rear road wheel and the outer rear road wheel occurs, so that the vehicle attitude control is started. Thus, in the flowchart illustrated in FIG. 7, the following sequence of processings is executed: the step S11→S12→S16→S17→S18→S19→S20→S19→S20→S25→S26. In this process, the vehicle attitude control flag is changed to "True" in the step S19, so that, when the flowchart illustrated in FIG. 7 is executed in the next cycle, the processing subroutine proceeds from the step S12 to the step S13, and the processings of the step S13 and the subsequent steps will be executed.

In the step S13, it is determined whether or not the low road surface friction mode is set. In the example of the time chart in FIG. 9, the low road surface friction mode is set, so that the processing subroutine proceeds to the step S14. In the step S14, it is determined whether or not the lateral acceleration detected by the lateral acceleration sensor 22 is greater than a given second lateral acceleration threshold $GY_b$ [G]. When the detected lateral acceleration is determined to be equal or less than the second lateral acceleration threshold $GY_b$, the processing subroutine proceeds to the step S16 without applying the lower limit braking force based on the pre-brake LSD control. Here, in this embodiment, the second lateral acceleration threshold $GY_b$ is set to a value less than the first lateral acceleration threshold $GY_a$. Specifically, in a state in which the lateral acceleration is significantly low, there is a low need for intervention of the pre-brake LSD control, and an unnecessary control intervention is likely to give the driver a feeling of strangeness. Therefore, in such a state, pre-brake LSD control is not executed.

On the other hand, when the detected lateral acceleration is determined to be greater than the second lateral acceleration threshold $GY_b$, the processing subroutine proceeds to the step S15. In the step S15, a basic instruction value $F_{b3}$ of the lower braking force for the pre-brake LSD control is set. In the step S15, the basic instruction value $F_{b3}$ is calculated by multiplying a maximum value of recently-set basic instruction values $F_{b1}$ for the vehicle attitude control by a given coefficient $C_{m3}$, as expressed in the following formula (4).

$$F_{b3} = C_{m3} \times F_{b1} \qquad (4)$$

In this embodiment, the coefficient $C_{m3}$ is set to a positive value less than 1. That is, the basic instruction value $F_{b3}$ for the pre-brake LSD control is set to a value which is always less than a maximum one of recently-set basic instruction values $F_{b1}$ for the vehicle attitude control. In the example illustrated in FIG. 9, during a period between the time $t_{11}$ and time $t_{12}$, the basic instruction value $F_{b1}$ for the vehicle attitude control has a rising tendency, so that a maximum value thereof is also successively updated, and therefore the basic instruction value $F_{b3}$ obtained by multiplying this maximum value by the coefficient $C_{m3}$ also increases. Then, during a period between the time $t_{12}$ and time $t_{13}$, the basic instruction value $F_{b1}$ for the vehicle attitude control becomes constant at its maximum value, i.e., the maximum value becomes a constant value, so that the basic instruction value $F_{b3}$ obtained by multiplying this maximum value by the coefficient $C_{m3}$ also becomes a constant value. Then, although, after the time $t_{13}$, the basic instruction value $F_{b1}$ for the vehicle attitude control has a falling tendency, the maximum value of the basic instruction value $F_{b1}$ is retained for further calculation, so that the basic instruction value $F_{b3}$ obtained by multiplying this maximum value by the coefficient $C_{m3}$ is maintained. The basic instruction value $F_{b3}$ for the pre-brake LSD control is maintained until the turning of the vehicle 1 is completed at time $t_{17}$, and the vehicle attitude control flag is changed to "False" (step S23→S24). As above, after the application of the first braking force based on the vehicle attitude control, a braking force equal to or greater than the given lower limit braking force is maintained until turning of the vehicle 1 is completed, even when the road wheel speed difference between the inner and outer rear road wheels becomes smaller.

The lower limit braking force based on the pre-brake LSD control is applied for the purpose of suppressing the situation where, if the application of the second braking force based on the brake LSD control is started (at time $t_{15}$ in FIG. 9) after the application of the first braking force based on the vehicle attitude control is completed (at time $t_{14}$ in FIG. 9), the magnitude of braking force applied to the inner rear road wheel of the vehicle 1 varies in a short period of time, thereby giving the driver a feeling of strangeness. On the other hand, in the situation where the high road surface friction mode is selected, it is rare that the application of the second braking force based on the brake LSD control is performed after completion of the application of the first braking force based on the vehicle attitude control, and, even in a case where the brake LSD control is executed, a braking force to be applied is relatively small. Therefore, in this embodiment, the lower limit braking force for the pre-brake LSD control is set only in the situation where the low road surface friction mode is selected, and the pre-brake LSD control is not executed in the situation where the high road surface friction mode is selected (step S13→S16 in FIG. 7). However, as one modification, the vehicle attitude control system of the present invention may be configured such that the pre-brake LSD control is executed even in the situation where the high road surface friction mode is selected. In this case, the coefficient $C_{m3}$ for the high road surface friction mode is preferably set to a value less than the coefficient $C_{m3}$ for the low road surface friction mode.

Then, in the example illustrated in FIG. 9, during a period between the time $t_{15}$ and time $t_{16}$, slip occurs in the inner rear road wheel, and the basic instruction value $F_{b2}$ for the brake LSD control is set. As above, in the example illustrated in FIG. 9, during a period between the time $t_{11}$ and the time $t_{14}$, the basic instruction value $F_{b1}$ for the vehicle attitude control is set. Further, during a period between the time $t_{11}$ and the time $t_{17}$, the basic instruction value $F_{b3}$ for the pre-brake LSD control is set, and, during a period between the time $t_{15}$ and the time $t_{16}$, the basic instruction value $F_{b2}$ for the brake LSD control is set.

In the step S25 illustrated in FIG. 7, a gain by which each of the basic instruction values is multiplied is set with respect to each of the basic instruction values, and each of three (final) instruction values $F_1$, $F_2$, $F_3$ is calculated by multiplying a respective one of the basic instruction values by the gain. Then, in the step S26, the instruction values $F_1$, $F_2$, $F_3$ are compared with each other to adopt a largest one of the instruction values, and a braking force corresponding to the largest instruction value is applied to the inner rear road wheel. The setting of the gain by which each of the basic instruction values is multiplied in the step S25 will be described later with reference to FIGS. 11 to 18.

Next, with reference to FIG. 10, setting of the threshold of the road wheel speed difference (first road wheel speed difference threshold $T_a$) for use in the step S17 illustrated in FIG. 7 will be described.

Figure 10:
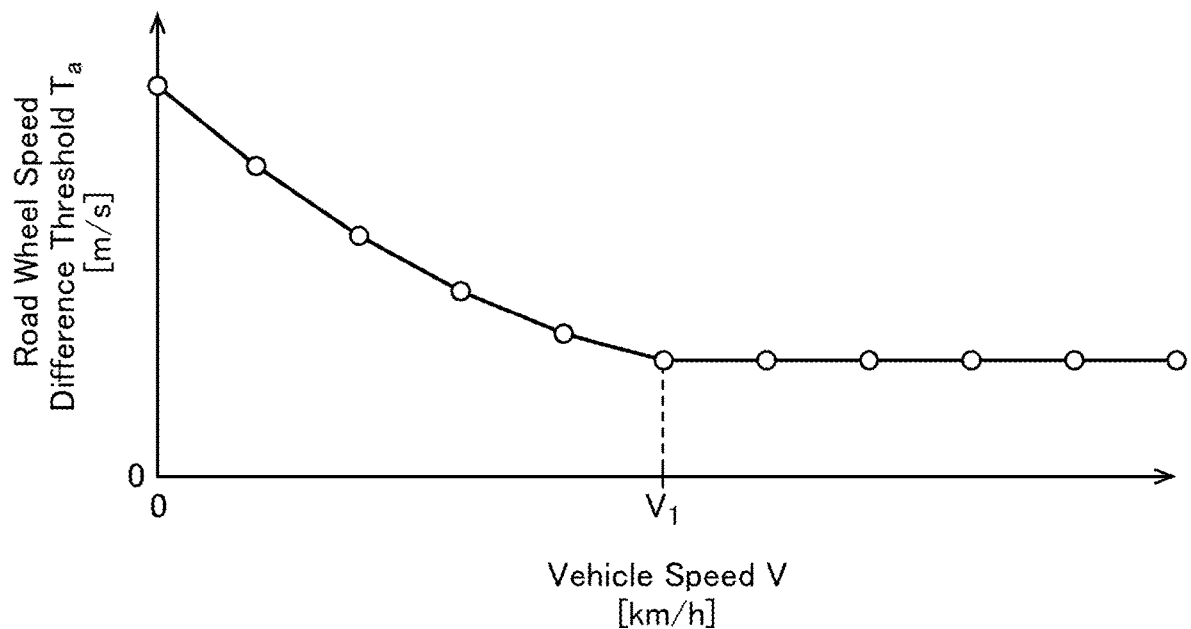
FIG. 10 is a map for setting a threshold of a road wheel speed difference, in the vehicle attitude control system according to the first embodiment.

FIG. 10 is one example of a map for setting the threshold of the road wheel speed difference. A value of the first road wheel speed difference threshold $T_a$ [m/sec] in the step S17 illustrated in FIG. 7 is set based on the map illustrated in FIG. 10. The value of the first road wheel speed difference threshold $T_a$ is changed based on the vehicle speed of the vehicle 1 detected by the vehicle speed sensor 20. As shown in FIG. 10, the value of the first road wheel speed difference threshold $T_a$ is maximum at a vehicle speed of 0, and, after decreasing along with an increase in vehicle speed, becomes approximately constant after the vehicle speed becomes equal to or greater than a given vehicle speed value $V_1$. Preferable, the given vehicle speed value $V_1$ is set to about 80 to about 100 [km/h], and the first road wheel speed difference threshold $T_a$ is set to become about 0.02 to about 0.05 [m/sec] at this value or more.

By changing the threshold of the road wheel speed difference according to the vehicle speed in the above manner, it is possible to change a condition for starting the execution of the vehicle attitude control. Specifically, by setting the first road wheel speed difference threshold $T_a$ as the threshold of the road wheel speed difference in the above manner, the vehicle attitude control to be executed at the step S18 and the subsequent steps in FIG. 7 becomes less likely to intervene, in a low vehicle speed range. More specifically, in the low vehicle speed range, errors are more likely to occur in measurement value of the road wheel speed. Thus, if the vehicle attitude control is executed when the road wheel speed difference is small, the vehicle attitude control is likely to be executed in the presence of the measurement errors. With a view to suppressing such an unnecessary intervention of the vehicle attitude control, in this embodiment, the value of the first road wheel speed difference threshold $T_a$ is set as shown in FIG. 10.

Next, with reference to FIGS. 11 to 19, a gain by which each of the basic instruction values is multiplied in the step S25 will be described.

Figure 11:
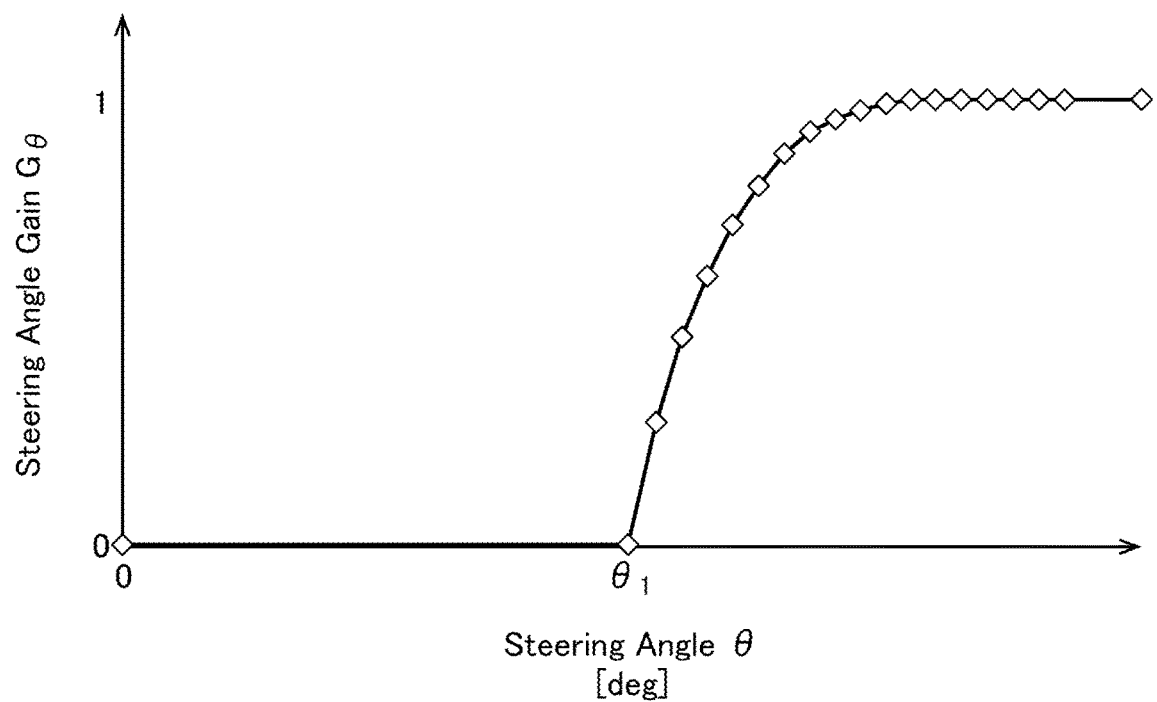
FIG. 11 is a map of a steering angle gain by which a basic instruction value is multiplied, in the vehicle attitude control system according to the first embodiment.
Figure 12:
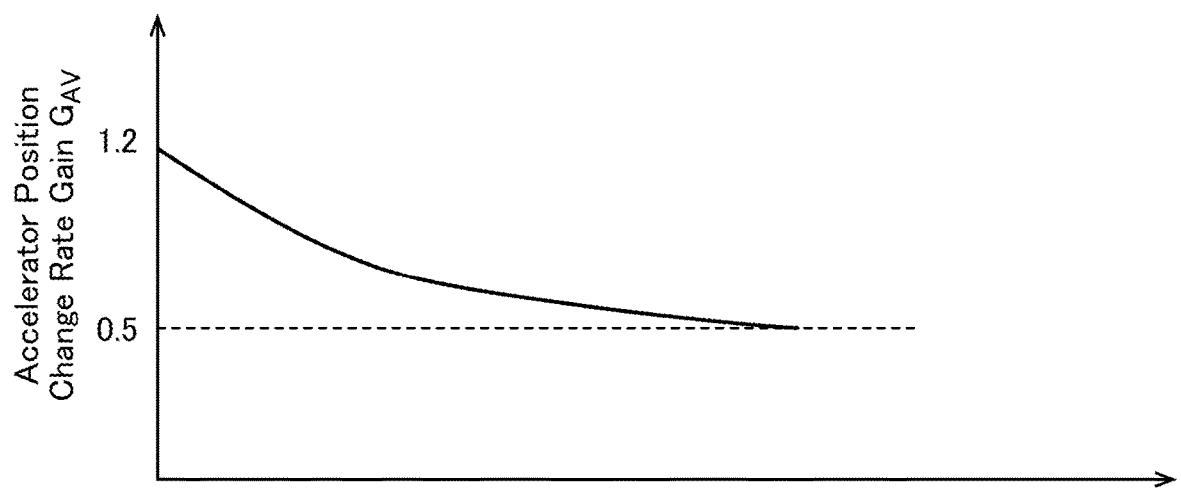
FIG. 12 is a map of an accelerator position change rate gain by which the basic instruction value is multiplied, in the vehicle attitude control system according to the first embodiment.
Figure 13:
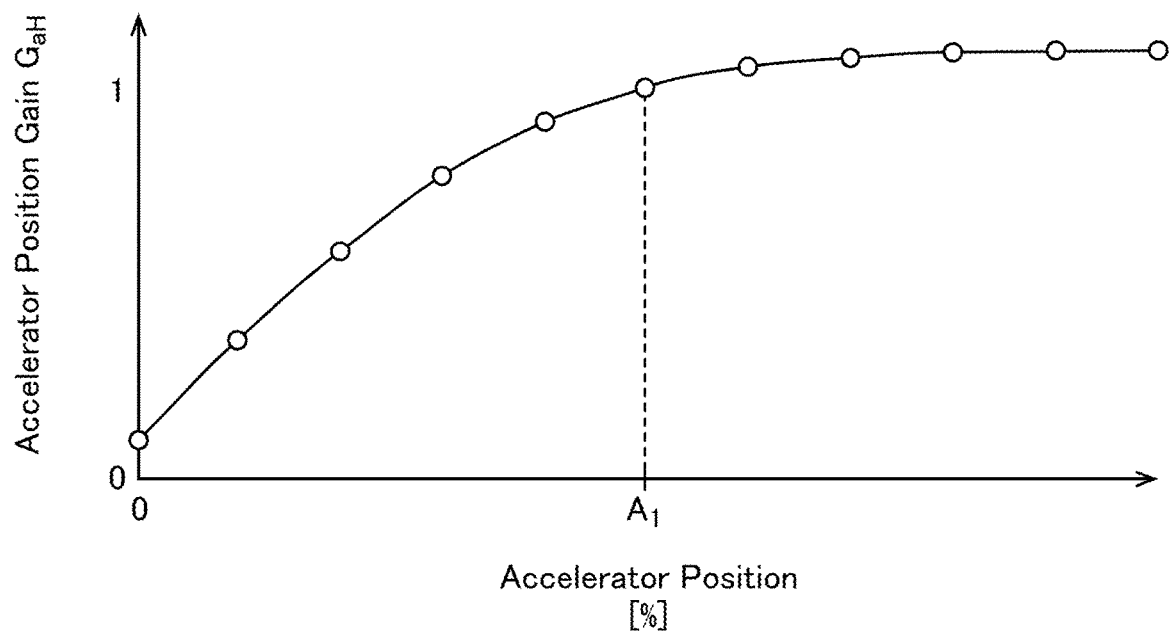
FIG. 13 is a map of an accelerator position gain by which the basic instruction value is multiplied, in the vehicle attitude control system according to the first embodiment.
Figure 14:
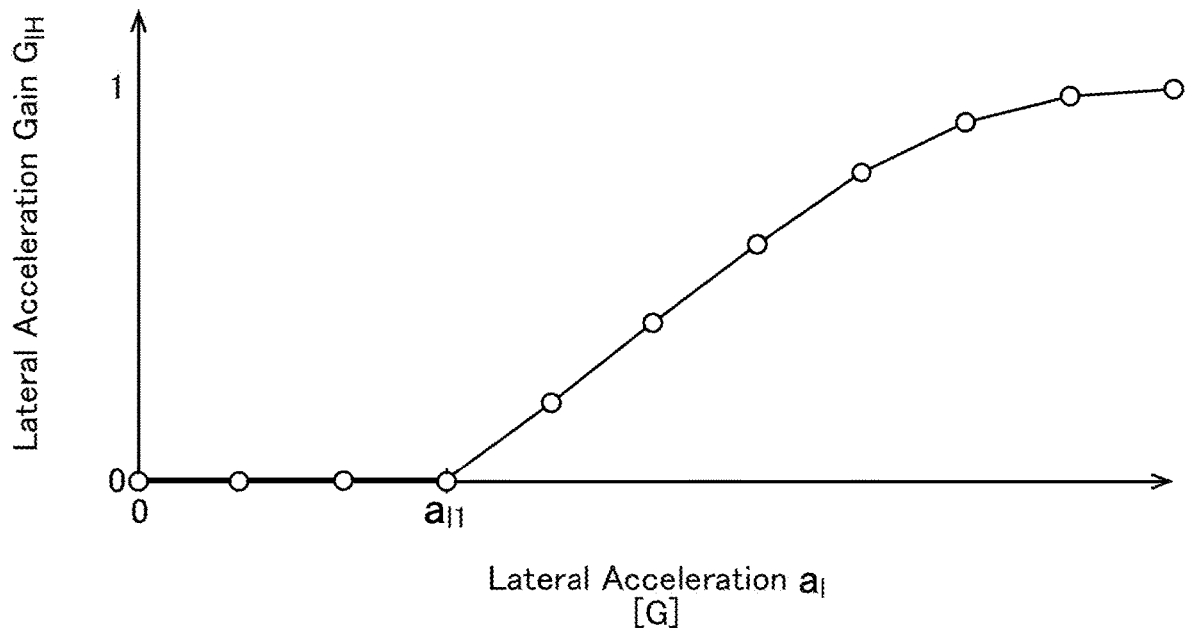
FIG. 14 is a map of a lateral acceleration gain by which the basic instruction value is multiplied, in the vehicle attitude control system according to the first embodiment.
Figure 15:
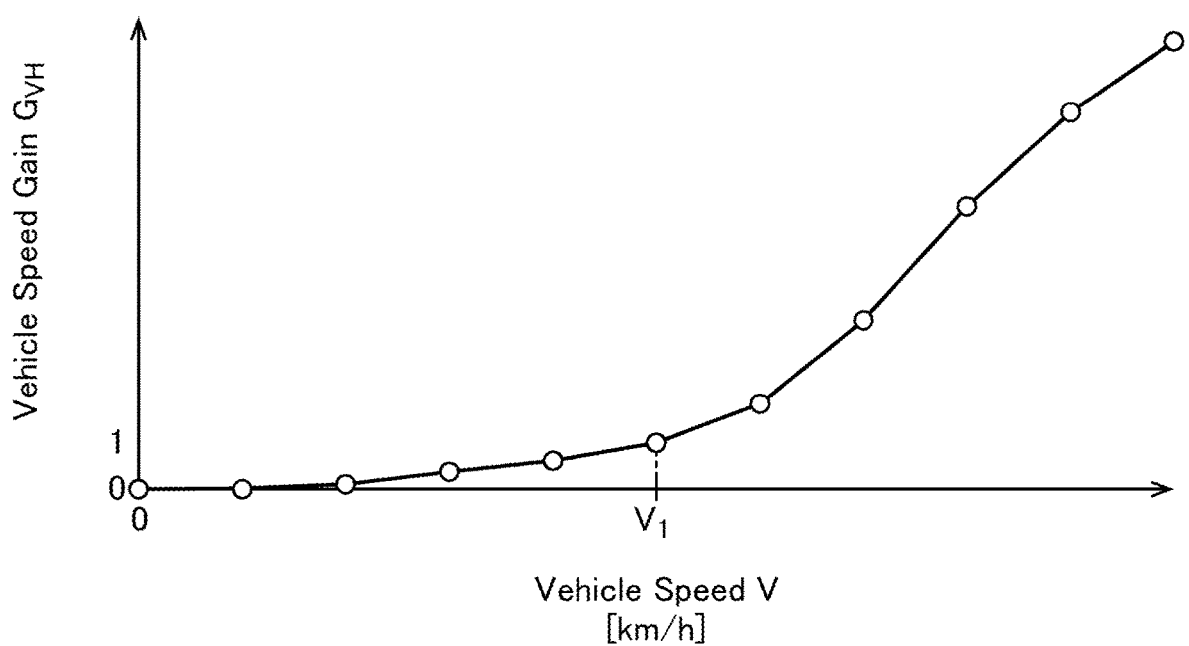
FIG. 15 is a map of a vehicle speed gain by which the basic instruction value is multiplied, in the vehicle attitude control system according to the first embodiment.

FIG. 11 is a map of a steering angle gain which is set based on the steering angle and by which the basic instruction value $F_{b1}$ for the vehicle attitude control is multiplied. FIG. 12 is a map of an accelerator position change rate gain which is set based on the change rate of the accelerator position and by which the basic instruction value for the vehicle attitude control is multiplied. Further, FIGS. 13 to 15 are maps for use in a situation where the high road surface friction mode is set. FIG. 13 is a map of an accelerator position gain which is set based on the accelerator position and by which the basic instruction value $F_{b1}$ for the vehicle attitude control is multiplied. FIG. 14 is a map of a lateral acceleration gain which is set based on the lateral acceleration and by which the basic instruction value $F_{b1}$ for the vehicle attitude control is multiplied. FIG. 15 is a map of a vehicle speed gain which is set based on the vehicle speed and by which the basic instruction value $F_{b1}$ for the vehicle attitude control is multiplied.

Figure 16:
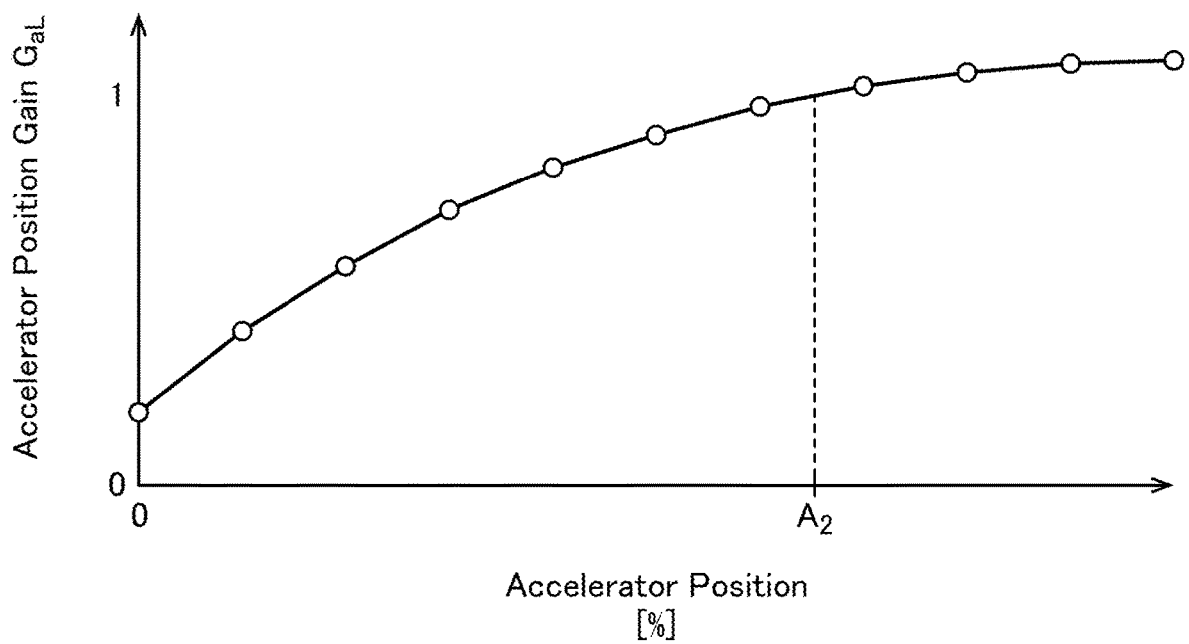
FIG. 16 is a map of an accelerator position gain by which the basic instruction value is multiplied, in the vehicle attitude control system according to the first embodiment.
Figure 17:
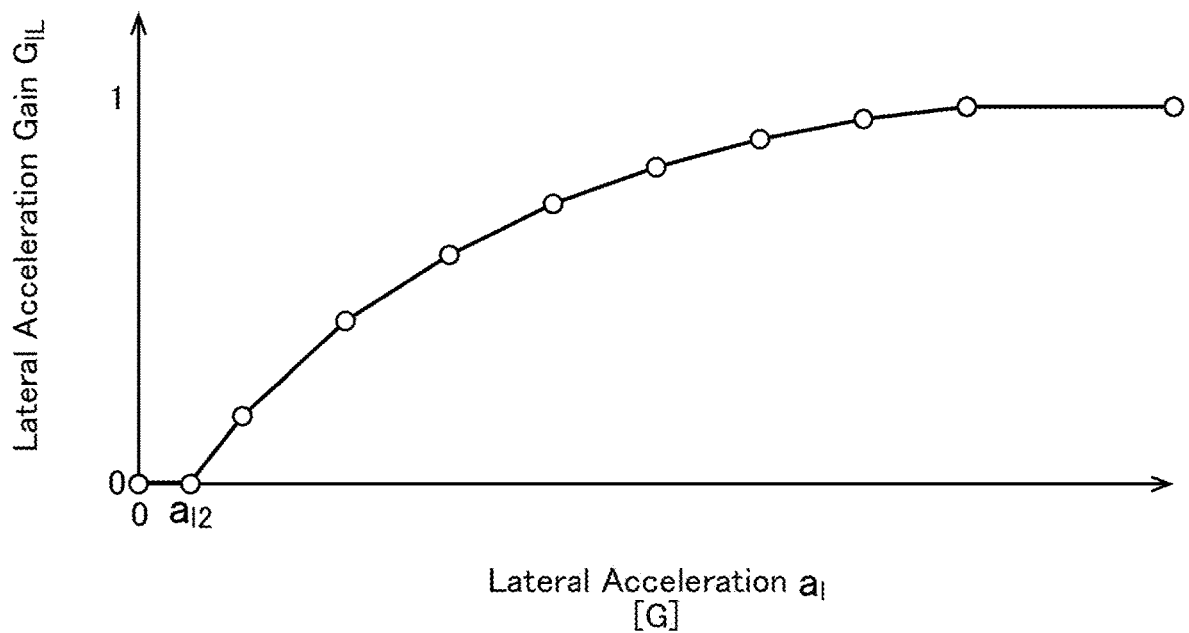
FIG. 17 is a map of a lateral acceleration gain by which the basic instruction value is multiplied, in the vehicle attitude control system according to the first embodiment.
Figure 18:
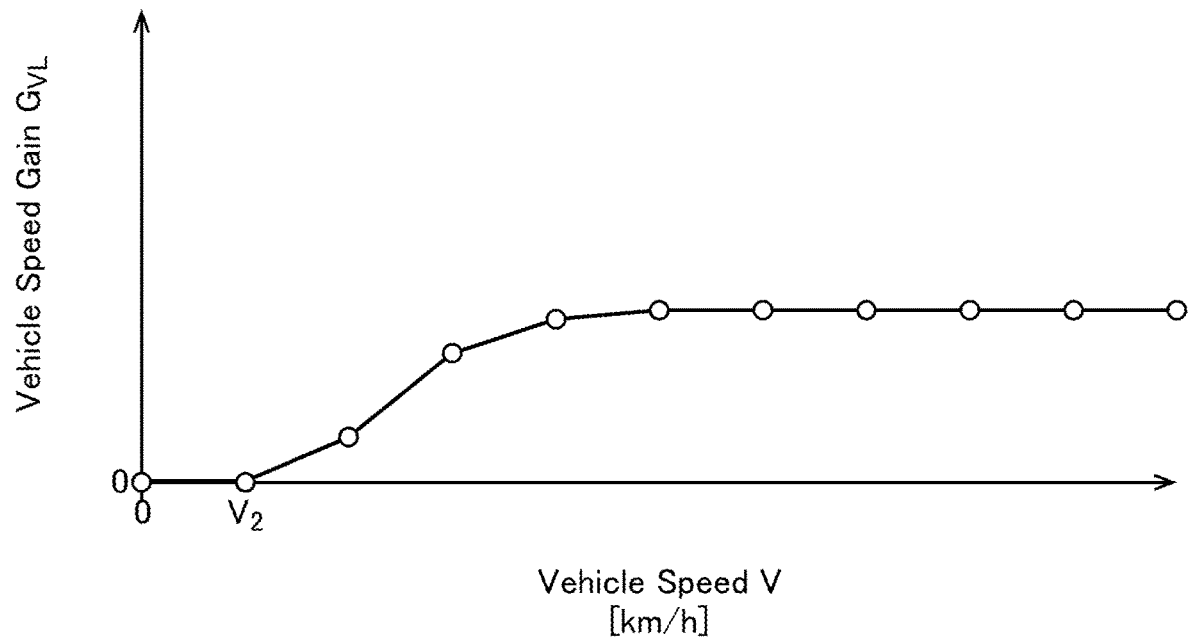
FIG. 18 is a map of a vehicle speed gain by which the basic instruction value is multiplied, in the vehicle attitude control system according to the first embodiment.
Figure 19:
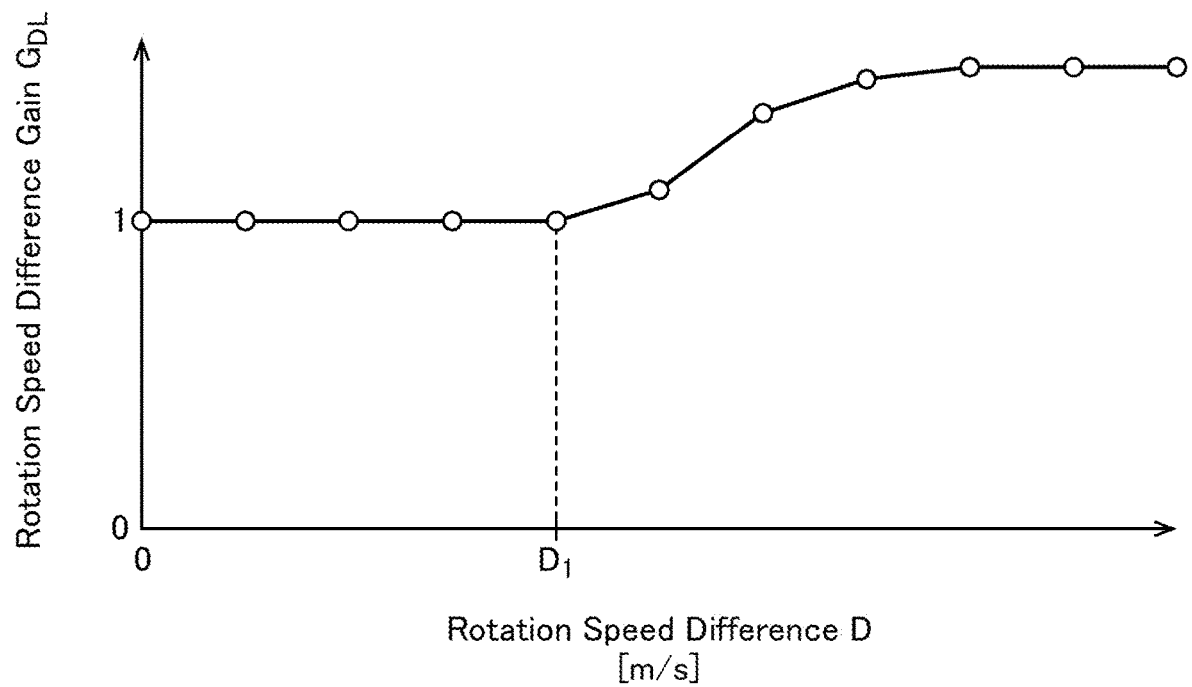
FIG. 19 is a map of a rotation speed difference gain by which a basic instruction value for brake limited slip differential (brake LSD) control is multiplied, in the vehicle attitude control system according to the first embodiment.

Further, FIGS. 16 to 18 are maps for use in a situation where the low road surface friction mode is set. FIG. 16 is a map of an accelerator position gain which is set based on the accelerator position and by which the basic instruction value $F_{b1}$ for the vehicle attitude control is to be multiplied. FIG. 17 is a map of a lateral acceleration gain which is set based on the lateral acceleration and by which the basic instruction value $F_{b1}$ for the vehicle attitude control is multiplied. FIG. 18 is a map of a vehicle speed gain which is set based on the vehicle speed and by which the basic instruction value $F_{b1}$ for the vehicle attitude control is multiplied. Further, FIG. 19 is a map of a rotation speed difference gain which is set based on the road wheel speed difference between the inner and outer rear road wheels and by which the basic instruction value $F_{b2}$ for the brake LSD control is multiplied As shown in FIG. 11, the steering angle gain $G_\theta$ is set such that it becomes zero in a range in which the steering angle θ [deg] is equal to or less than a first steering angle value $\theta_1$, and increases after the steering angle becomes greater than $\theta_1$, whereafter it converges to "1" after the steering angle becomes equal to or greater than a given value. By setting the steering angle gain $G_\theta$ in this manner, in the range in which the steering angle θ [deg] is equal to or less than the first steering angle value $\theta_1$, the vehicle attitude control is not substantially executed, thereby avoiding control intervention (as a result of multiplication by the steering angle gain $G_\theta$, the final instruction value for the vehicle attitude control becomes zero). This makes it possible to suppress a situation where, due to intervention of the vehicle attitude control executed in response to small turning manipulation of the steering wheel 6, a feeling of strangeness is given to the driver. Preferably, the first steering angle value $\theta_1$ is set to about 3.5 to about 6.0 [deg], and the steering angle gain $G_\theta$ is set such that it becomes zero in the range in which the steering angle θ [deg] is equal to or less than this value.

As shown in FIG. 12, an accelerator position change rate gain $G_{AV}$ is set such that it is "1.2" in a region in which the change rate of the accelerator position (accelerator position change rate) AV is around zero, and decreases along with an increase in the change rate, whereafter it converses to "0.5" in a range in which the change rate is equal to or greater than a given value. Here, when the driver quickly depresses the accelerator pedal (not shown) of the vehicle to cause an increase in the road wheel speed difference (rotation speed difference) between the inner and outer rear road wheels, the LSD 4d equipped in the differential gear unit 4c operates. According to the operation of the LSD 4d, the road wheel speed difference is rapidly reduced.

If the vehicle attitude control is activated in a manner overlapping with the operation of the LSD 4d and a large braking force is applied to the inner rear road wheel, the road wheel speed difference change rate is likely to excessively increase, thereby giving the driver a feeling of strangeness. Therefore, the accelerator position change rate gain $G_{AV}$ is set to reduce a braking force to be applied based on the vehicle attitude control, in the situation where the accelerator pedal (not shown) is rapidly depressed. Specifically, based on multiplication by the accelerator position change rate gain $G_{AV}$ set as shown in FIG. 12, a braking force to be applied to the inner rear road wheel of the vehicle being turning is more reduced as the change rate of the accelerator position detected by the accelerator position sensor becomes larger. This makes it possible to suppress a situation where the road wheel speed difference change rate excessively increases, thereby giving the driver a feeling of strangeness.

As shown in FIG. 13, the accelerator position gain $G_{aH}$ is set such that it increases along with an increase in the accelerator position [%] to reach "1" at a first accelerator position value $A_1$, and, after the accelerator position becomes greater than the first accelerator position value $A_1$, converges to a given value greater than "1". By setting the accelerator position gain $G_{aH}$ in this manner, the final instruction value for the vehicle attitude control becomes smaller along with a decrease in the accelerator position. Specifically, in a range in which the acceleration position is small, uplift of the inner rear portion of the vehicle body 1a is less likely to occur. Thus, the above setting makes it possible to suppress a situation where, due to unnecessary intervention of the vehicle attitude control in such a range, a feeling of strangeness is given to the driver. Preferably, the first accelerator position value $A_1$ is set to about 45 to about 60 [%], and the accelerator position gain $G_{aH}$ is set such that it becomes equal to less than "1" in a range in which the acceleration position is equal to or less than this value, and becomes greater than "1" in a range in which the acceleration position is greater than this value.

As shown in FIG. 14, the lateral acceleration gain $G_{lH}$ is set such that it becomes zero in a range in which the lateral acceleration $a_l$ [G] is equal to or less than a first lateral acceleration value $a_{l1}$, and increases after the lateral acceleration becomes greater than $a_{l1}$, whereafter it converges to "1" after the lateral acceleration becomes equal to or greater than a given value. By setting the lateral acceleration gain $G_{lH}$ in this manner, it is possible to apply, to the inner rear road wheel of the vehicle being turning, a larger braking force when the lateral acceleration of the vehicle 1 is relatively large than when the lateral acceleration of the vehicle 1 is relatively small. Further, by setting the lateral acceleration gain $G_{lH}$ as shown in FIG. 14, in a range in which the lateral acceleration is equal to or less than the first lateral acceleration value $a_{l1}$, intervention of the vehicle attitude control is substantially avoided (as a result of multiplication by the lateral acceleration gain $G_{lH}$, the final instruction value for the vehicle attitude control becomes zero). Specifically, in a range in which the lateral acceleration $a_l$ is small, uplift of the inner rear portion of the vehicle body 1a is less likely to occur. Thus, the above setting makes it possible to suppress a situation where, due to unnecessary intervention of the vehicle attitude control in such a range, a feeling of strangeness is given to the driver. Preferably, the first lateral acceleration value $a_{l1}$ is set to about 0.22 to about 0.35 [G], and the lateral acceleration gain $G_{lH}$ is set such that it becomes zero in the range in which the lateral acceleration is equal to or less than this value.

As shown in FIG. 15, the vehicle speed gain $G_{VH}$ is set such that it increases along with an increase in the vehicle speed [km/h] to reach "1" at a first vehicle speed value $V_1$, and relatively rapidly increases after the vehicle speed becomes greater than first vehicle speed value $V_1$. By setting the vehicle speed gain $G_{VH}$ in this manner, it is possible to apply, to the inner rear road wheel of the vehicle being turning, a larger braking force when the vehicle speed is relatively high than when the vehicle speed is relatively low. Specifically, in a range in which the vehicle speed is small, uplift of the inner rear portion of the vehicle body 1a is less likely to occur. However, the problem of uplift of the inner rear portion of the vehicle body 1a becomes more prominent along with an increase in the vehicle speed. Thus, in this situation, the final instruction value for the vehicle attitude control is increased to cause the vehicle attitude control to strongly intervene. Preferably, the first vehicle speed value $V_1$ is set to about 95 to about 115 [km/h], and the vehicle speed gain $G_{VH}$ is set such that it becomes equal to less than "1" in a range in which the vehicle speed is equal to or less than this value, and relatively rapidly increases in a range in which the vehicle speed is greater than this value.

In the step S25 illustrated in FIG. 7, in the situation where the high road surface friction mode is selected, the final instruction value $F_1$ for the vehicle attitude control is calculated by multiplying the basic instruction value $F_{b1}$ for the vehicle attitude control by the steering angle gain $G_\theta$ set as shown in FIG. 11, the accelerator position change rate gain $G_{AV}$ set as shown in FIG. 12, the accelerator position gain $G_{aH}$ set as shown in FIG. 13, the lateral acceleration gain $G_{lH}$ set as shown in FIG. 14, and the vehicle speed gain $G_{VH}$ set as shown in FIG. 15, as expressed in the following formula (5).

$$F_1 = G_\theta \times G_{AV} \times G_{aH} \times G_{lH} \times G_{VH} F_{b1} \quad (5)$$

On the other hand, in the situation where the low road surface friction mode is selected, each of the accelerator position gain, the lateral acceleration gain and the vehicle speed gain is set using a corresponding one of the maps illustrated in FIGS. 16 to 18 which are different from those used in the situation where the high road surface friction mode is selected.

As shown in FIG. 16, in the situation where the low road surface friction mode is selected, the accelerator position gain $G_{aL}$ is set such that it increases along with an increase in the accelerator position [%] to reach "1" at a second accelerator position value $A_2$, and after the accelerator position becomes greater than the second accelerator position value $A_2$, increases to a given value greater than "1". By setting the accelerator position gain $G_{aL}$ in this manner, the final instruction value for the vehicle attitude control becomes smaller along with a decrease in the accelerator position. Further, the second accelerator position value $A_2$ at which the accelerator position gain $G_{aL}$ in the low road surface friction mode becomes "1" is set to be greater than the first accelerator position value $A_1$ at which the accelerator position gain $G_{aH}$ in the high road surface friction mode becomes "1". Preferably, the second accelerator position value $A_2$ is set to about 60 to about 75 [%], and the accelerator position gain $G_{aL}$ is set such that it becomes equal to less than "1" in a range in which the acceleration position is equal to or less than this value, and becomes greater than "1" in a range in which the acceleration position is greater than this value.

As shown in FIG. 17, in the situation where the low road surface friction mode is selected, the lateral acceleration gain $G_{lL}$ is set such that it becomes zero in a range in which the lateral acceleration $a_l$ [G] is equal to or less than a second lateral acceleration value $a_{l2}$, and increases after the lateral acceleration becomes greater than the second lateral acceleration value an, whereafter it converges to "1" after the lateral acceleration becomes equal to or greater than a given value. As above, in the low road surface friction mode, the lateral acceleration gain different from that in the high road surface friction mode is set, so that, in the low and high road surface friction modes, different braking forces are generated with respect to the same lateral acceleration value. Further, by setting the lateral acceleration gain $G_{lL}$ in the above manner, in a range in which the lateral acceleration is equal to or less than the second lateral acceleration value $a_{l2}$, intervention of the vehicle attitude control is substantially avoided (as a result of multiplication by the lateral acceleration gain $G_{lL}$, the final instruction value for the vehicle attitude control becomes zero). Further, in this embodiment, differently from the first lateral acceleration value $a_{l1}$ at which the lateral acceleration gain $G_{lL}$ in the high road surface friction mode becomes greater than zero, the second lateral acceleration value $a_{l2}$ at which the lateral acceleration gain $G_{lL}$ in the low road surface friction mode becomes greater than zero is set to be less than the first lateral acceleration value $a_{l1}$. That is, in the low road surface friction mode, intervention of the vehicle attitude control is started from a state in which the lateral acceleration is small, as compared to the road surface friction mode. Preferably, the second lateral acceleration value $a_{l2}$ is set to about 0.02 to about 0.15 [G], and the lateral acceleration gain $G_{lL}$ is set such that it becomes zero in the range in which the lateral acceleration is equal to or less than this value.

As shown in FIG. 18, in the situation where the low road surface friction mode is selected, the vehicle speed gain $G_{VL}$ is set such that it becomes zero in a range in which the vehicle speed is equal to or less than a second vehicle speed value $V_2$, and increases after the vehicle speeds becomes greater than the second vehicle speed value $V_2$, whereafter it converges to a given value less than "1" after the vehicle speed becomes equal to or greater than a given value. This makes it possible to apply, to the inner rear road wheel of the vehicle being turning, a larger braking force when the vehicle speed is relatively high than when the vehicle speed is relatively low. Further, by setting the vehicle speed gain $G_{VL}$ in this manner, intervention of the vehicle attitude control is avoided in the range in which the vehicle speed is equal to or less than the second vehicle speed value $V_2$, and the final instruction value for the vehicle attitude control is set to a relatively small value even in a high vehicle speed range. That is, in the situation where the low road surface friction mode is selected, intervention of the vehicle attitude control is suppressed in any vehicle speed range, as compared to the high road surface friction mode. In other words, it is intended to suppress a situation where slip occurs in the inner rear road wheel due to a braking force based on the vehicle attitude control. Preferably, the second vehicle speed value $V_2$ is set to about 15 to about 30 [km/h], and the vehicle speed gain $G_{VL}$ is set such that it converges to about 0.3 to about 0.6 in the high vehicle speed range.

In the step S25 illustrated in FIG. 7, in the situation where the low road surface friction mode is selected, the final instruction value $F_1$ for the vehicle attitude control is calculated by multiplying the basic instruction value $F_{b1}$ for the vehicle attitude control by the steering angle gain $G_\theta$ set as shown in FIG. 11, the accelerator position change rate gain $G_{AV}$ set as shown in FIG. 12, the accelerator position gain $G_{aL}$ set as shown in FIG. 16, the lateral acceleration gain $G_{lL}$ set as shown in FIG. 17, and the vehicle speed gain $G_{VL}$ set as shown in FIG. 18, as expressed in the following formula (6).

$$F_1 = G_\theta \times G_{AV} \times G_{aL} \times G_{lL} \times G_{VL} \times F_{b1} \quad (6)$$

Next, with reference to FIG. 19, a rotation speed difference gain $G_{DL}$ by which the basic instruction value $F_{b3}$ for the brake LSD control is multiplied in the situation where the low road surface friction mode is selected will be described. Here, in the situation where the high road surface friction mode is selected, the rotation speed difference gain $G_{DL}$ is always "1".

As shown in FIG. 19, the rotation speed difference gain $G_{DL}$ is set such that it is kept at "1" when a difference in rotation speed between an inner road wheel and an outer road wheel is equal to or less than a first rotation speed difference value $D_1$ [m/sec], and converges to a given value greater than "1" when the rotation speed difference is greater than the first rotation speed difference value $D_1$. By setting the rotation speed difference gain $G_{DL}$ in this manner, the final instruction value for the brake LSD control increases after the rotation speed difference becomes greater than the first rotation speed difference value $D_1$. Thus, in the situation where the low road surface friction mode is selected, a braking force to be applied to the inner road wheel when slip occurs in the inner road is set to a value greater than that in the situation where the high road surface friction mode is selected, thereby strongly suppressing slip of the inner road wheel. Preferably, the first rotation speed difference value $D_1$ is set to about 8 to about 12 [m/sec], and the final instruction value for the brake LSD control is set such that it increase in a range in which the rotation speed difference becomes greater than the first rotation speed difference value $D_1$. Further, the rotation speed difference gain $G_{DL}$ is set such that it converges to about 1.3 to about 1.6 in a range in which the rotation speed difference D is large.

In the step S25 illustrated in FIG. 7, in the situation where the low road surface friction mode is selected, the final instruction value $F_2$ for the brake LSD control is calculated by multiplying the basic instruction value $F_{b2}$ for the brake LSD control by the rotation speed difference gain $G_{DL}$ set as shown in FIG. 19, as expressed in the following formula (7). On the other hand, in the situation where the high road surface friction mode is selected, the rotation speed difference gain $G_{DL}$ is kept at "1", and therefore the basic instruction value $F_{b2}$ is directly used as the final instruction value $F_2$.

$$F_2 = G_{DL} \times F_{b2} \qquad (7)$$

As above, in the step S25, the final instruction value $F_1$ for the vehicle attitude control is calculated by the formula (5) or (6) based on the basic instruction value $F_{b1}$ for the vehicle attitude control. Further, the final instruction value $F_2$ for the brake LSD control is calculated by the formula (7) based on the basic instruction value $F_{b2}$ for the brake LSD control, or the basic instruction value $F_{b2}$ is directly used as the final instruction value $F_2$.

Further, in the situation where the low road surface friction mode is selected, the final instruction value $F_3$ for the pre-brake LSD control is calculated by multiplying the basic instruction value $F_{b3}$ for the pre-brake LSD control by the same gains as those used in the vehicle attitude control. That is, the final instruction value $F_3$ is calculated by the following formula (8). As mentioned above, the lower limit braking force based on the pre-brake LSD control is applied for the purpose of suppressing a change in braking force occurring in the period between completion of the application of the first braking force based on the vehicle attitude control and start of the application of the second braking force based on the brake LSD control. Therefore, with regard to the final instruction value for the pre-brake LSD control, the basic instruction value for the pre-brake LSD control is multiplied by the same gains as those used in the vehicle attitude control, thereby setting the lower limit braking force such that it is smoothly continuous with the first braking force based on the vehicle attitude control.

$$F_3 = G_\theta \times G_{aL} \times G_{IL} \times G_{VL} \times F_{b3} \qquad (8)$$

On the other hand, in the situation where the high road surface friction mode is selected, the pre-brake LSD control is not executed (the final instruction value $F_3$ for the pre-brake LSD control=0). However, as one modification, the vehicle attitude control system may be configured such that the pre-brake LSD control is executed even in the situation where the high road surface friction mode is selected. In this case, the final instruction value $F_3$ may be calculated by the following formula (9). This makes it possible to set, in the high road surface friction mode, the lower limit braking force such that it is smoothly continuous with the first braking force based on the vehicle attitude control.

$$F_3 = G_\theta \times G_{aH} \times G_{IH} \times G_{VH} \times F_{b3} \qquad (9)$$

In the step S26 illustrated in FIG. 7, current ones of the final instruction value $F_1$ for the vehicle attitude control, the final instruction value $F_2$ for the brake LSD control and the final instruction value $F_3$ for the pre-brake LSD control are compared with each other, and a largest one of the final instruction values is finally set as an instruction value of a braking force be applied to the inner rear road wheel. Upon completion of the setting of the braking force instruction value in the step S26, the processing subroutine proceeds to the step S5 of the flowchart in FIG. 6. In the step S5, the brake unit 8 of the inner rear road wheel is controlled based on the set instruction value.

In the vehicle attitude control system according to the first embodiment, during turning of the vehicle based on the turning manipulation of the steering wheel, a larger braking force is applied to the inner rear road wheel of the vehicle being turning, when the lateral acceleration $a_l$ of the vehicle 1 is relatively large than when the lateral acceleration $a_l$ of the vehicle 1 is relatively small (FIG. 14, FIG. 17). Upon applying the braking force (instruction value $F_1$) to the inner rear road wheel of the vehicle 1, a force acts on the vehicle body 1a through the suspension unit 3 to pull the inner rear portion of the vehicle body 1a downwardly, so that it is possible to suppress uplift of the inner rear portion of the vehicle body 1a.

In the vehicle attitude control system according to the first embodiment, a breaking force (instruction value $F_1$) to be applied to the inner rear road wheel of the vehicle 1 is set based on the difference in road wheel speed between the inner rear road wheel and the outer rear road wheel (the step S16 in FIG. 7), and the lateral acceleration $a_l$ of the vehicle 1, so that it is possible to more accurately set a braking force for suppressing the uplift of the inner rear portion of the vehicle body 1a.

In the vehicle attitude control system according to the first embodiment, a larger braking force is applied to the inner rear road wheel of the vehicle 1 being turning, when the vehicle speed V is relatively high than when the vehicle speed V is relatively low (FIG. 15, FIG. 18), so that it is possible to appropriately set the braking force according to the vehicle speed V.

In the vehicle attitude control system according to the first embodiment, a larger braking force is applied to the inner rear road wheel of the vehicle being turning when the accelerator position is relatively large than when the accelerator position is relatively small (FIG. 13, FIG. 16), so that it is possible to appropriately set the braking force according to the accelerator position.

In the vehicle attitude control system according to the first embodiment, when the steering angle θ according to turning manipulation of the steering wheel 6 is equal to or less than the given value, the vehicle attitude control is not executed (braking force based on the vehicle attitude control=0), so that it is possible to prevent a situation where intervention of the vehicle attitude control occurs in response to a small steering manipulation at a level unintended by a driver, thereby giving the driver a feeling of strangeness.

In the vehicle attitude control system according to the first embodiment, with respect to the same lateral acceleration, different braking forces are generated, respectively, in the low road surface friction mode (FIG. 17) and in the high road surface friction mode (FIG. 14), so that it is possible to appropriately set the braking force according to the road surface friction.

In the vehicle attitude control system according to the first embodiment, in the high road surface friction mode, the vehicle attitude control is executed when the lateral acceleration becomes equal to or greater than the first lateral acceleration value $a_{l1}$ (FIG. 14), and, in the low road surface friction mode, the vehicle attitude control is executed when the lateral acceleration becomes equal to or greater than the second lateral acceleration value $a_{l2}$ (FIG. 17), so that it is possible to start the execution of the vehicle attitude control at an appropriate timing according to the road surface friction.

In the vehicle attitude control system according to the first embodiment, a condition for starting the execution of the vehicle attitude control (the step S17 in FIG. 7; FIG. 10) is changed according to the vehicle speed V, so that it is possible to start the execution of the vehicle attitude control at an appropriate timing according to the vehicle speed.

In the vehicle attitude control system according to the first embodiment, the upper arm 3a and the lower arm 3b constituting the link mechanism suspending an axle portion of each of the rear road wheels 2c, 2d with respect to the vehicle body 1a suspends the axle portion 2e such that the axle portion is swingable about the given suspension center PS (FIG. 4). Further, the suspension center is located above the axle portion 2e. Thus, when a braking force is applied to the rear road wheel 2c or 2d, a force component pulling the vehicle body 1a downwardly through the upper arm 3a and the lower arm 3b is increased, so that it is possible to more effectively suppress the uplift of the inner rear portion of the vehicle body.

In the vehicle attitude control system according to the first embodiment, the vehicle comprises the mechanical limited slip differential 4d, so that, based on an function of the limited slip differential, the difference in road wheel speed between the inner rear road wheel and the outer rear road wheel is more rapidly reduced as the acceleration position becomes larger. If the brake control device 14a operates to apply a braking force to the inner rear road wheel based on the vehicle attitude control, in addition to the above action of the limited slip differential 4d, a change in the road wheel speed difference between the inner and outer rear road wheels is likely to excessively increase, thereby giving a driver a feeling of strangeness. In the vehicle attitude control system according to the first embodiment, the braking force to be applied to the inner rear road wheel is controlled to become smaller as the change rate of the accelerator position becomes larger (FIG. 12), so that it is possible to suppress a feeling of strangeness to be given to the driver.

Next, with reference to FIGS. 20 and 21, a vehicle attitude control system according to a second embodiment of the present invention will be described.

The vehicle attitude control system according to the second embodiment is different from the first embodiment in that the first braking force to be applied based on the vehicle attitude control is set by the same control algorism, irrespective of a road surface friction state of a road surface on which the vehicle 1 is traveling. Therefore, only a difference of the second embodiment from the first embodiment will be described here, and the common configuration and functions/effects will be omitted. Specifically, in the aforementioned first embodiment, the vehicle attitude control is executed differently between the situation where the low road surface friction mode is selected and the situation where the high road surface friction mode is selected, whereas, in the second embodiment, as long as the same lateral acceleration acts on the vehicle 1, the same braking force is applied, irrespective of the road surface friction state of the road surface on which the vehicle 1 is traveling.

Figure 20:
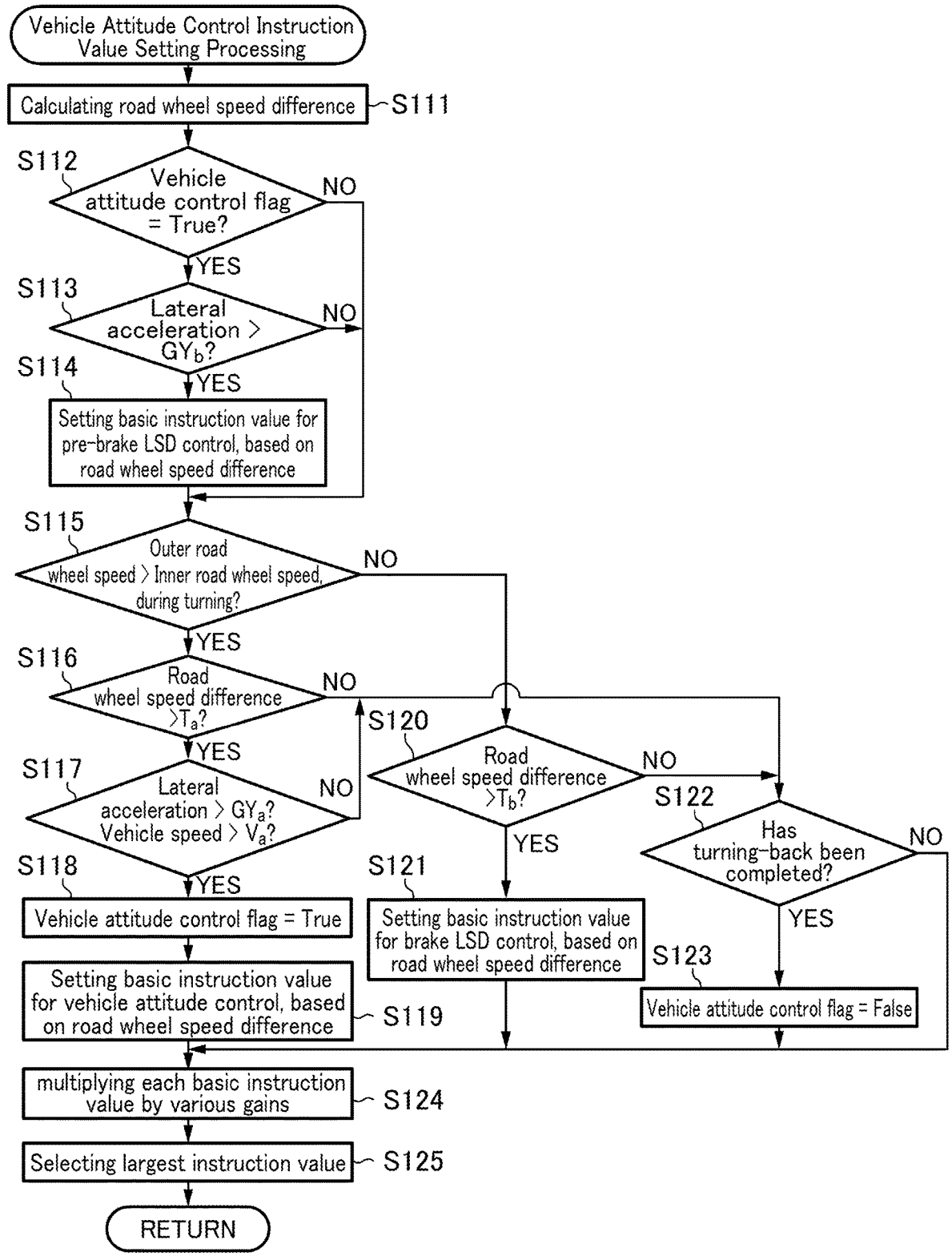
FIG. 20 is a flowchart showing processing for setting an instruction value in a vehicle attitude control system according to a second embodiment of the present invention.

FIG. 20 is a flowchart showing processing for setting an instruction value for the vehicle attitude control, which corresponds to FIG. 7 regarding the first embodiment.

In the flowchart illustrated in FIG. 7 regarding the first embodiment, in the step S13, it is determined whether or not the low road surface friction mode is selected, Then, when the low road surface friction mode is determined to be selected, the basic instruction value for the pre-brake LSD control is set in the step S15. On the other hand, when the low road surface friction mode is determined not to be selected (when the high road surface friction mode is selected), the pre-brake LSD control is not executed.

Differently from the first embodiment, in the second embodiment, there is no selection between the "low road surface friction mode" and the "high road surface friction mode", and a basic instruction value for the pre-brake LSD control is set, irrespective of the road surface friction state. Specifically, in the second embodiment, as shown in FIG. 20, in a situation where the vehicle attitude control flag is "True" (step S112), and the lateral acceleration detected by the lateral acceleration sensor 22 is greater than the given second lateral acceleration threshold $GY_b$ [G] (step S113), a basic instruction value $F_{b3}$ of the lower limit braking force for the pre-brake LSD control is always set in step S114. The flowchart illustrated in FIG. 20 is the same as the flowchart illustrated in FIG. 7, except that there is no selection between the low road surface friction mode and the high road surface friction mode. That is, in the step S114, the basic instruction value $F_{b3}$ is calculated by multiplying a maximum value of recently-set basic instruction values $F_{b1}$ for the vehicle attitude control by a given coefficient $C_{m3}$, as expressed in the following formula (10).

$$F_{b3}=C_{m3}\times F_{b1} \quad (10)$$

In the second embodiment, a basic instruction value $F_{b1}$ [N] for the vehicle attitude control to be calculated in step S119 illustrated in FIG. 20 is set based on the road wheel speed difference between the left and right rear road wheels, in the same manner as that in the step S20 illustrated in FIG. 7. This basic instruction value $F_{b1}$ is an instruction value of a braking force to be applied to the inner rear road wheel of the vehicle 1 being turning, and is calculated by multiplying a difference between the outer road wheel speed $V_o$ and the inner road wheel speed $V_i$ by a given coefficient $C_{m1}$, as expressed in the following formula (11).

$$F_{b1}=C_{m1}\times(V_o-V_i) \quad (11)$$

In the second embodiment, a basic instruction value $F_{b2}$ [N] for the brake LSD control to be calculated in step S121 illustrated in FIG. 20 is set based on the road wheel speed difference between the left and right rear road wheels, in the same manner as that in the step S22 illustrated in FIG. 7. This basic instruction value $F_{b2}$ of the second braking force for the brake LSD control is an instruction value of a braking force to be applied to the inner rear road wheel of the vehicle 1 being turning, and is calculated by multiplying a difference between the inner road wheel speed $V_i$ and the outer road wheel speed $V_o$ by a given coefficient $C_{m2}$, as expressed in the following formula (12).

$$F_{b2}=C_{m2}\times(V_i-V_o) \quad (12)$$

In step S124 illustrated in FIG. 20, each of a final instruction value $F_1$ for the vehicle attitude control, a final instruction value $F_2$ for the brake LSD control and a final instruction value $F_3$ for the pre-brake LSD control is calculated by multiplying a corresponding one of the basic instruction values $F_{b1}$, $F_{b2}$, $F_{b3}$ by given gains.

Specifically, the final instruction value $F_1$ for the vehicle attitude control is calculated by multiplying the basic instruction value $F_{b1}$ by a steering angle gain $G_\theta$, an accelerator position change rate gain $G_{AV}$, an accelerator position gain $G_a$, a lateral acceleration gain $G_l$, and a vehicle speed gain $G_V$, as expressed in the following formula (13).

$$F_1 = G_\theta \times G_{AV} \times G_a \times G_I \times G_V \times F_{b1} \quad (13)$$

Here, as each of the steering angle gain $G_\theta$ and the accelerator position change rate gain $G_{AV}$ in the formula (13), the same gain as a respective one of the steering angle gain $G_\theta$ and the accelerator position change rate gain $G_{AV}$ set inn the first embodiment may be used. Further, as the accelerator position gain $G_a$, the lateral acceleration gain $G_l$ and the vehicle speed gain $G_V$, the same gain as a respective one of the accelerator position gain $G_{aH}$, the lateral acceleration gain $G_{IH}$ and the vehicle speed gain $G_{VH}$ set in the first embodiment in the situation where the high road surface friction mode is selected may be used. Alternatively, it is possible to set a gain different from the gain set in the first embodiment.

The final instruction value $F_2$ for the brake LSD control is calculated by multiplying the basic instruction value $F_{b2}$ for the brake LSD control by a rotation speed difference gain $G_D$, as expressed in the following formula (14). Here, the rotation speed difference gain $G_D$ is set based on a map illustrated in FIG. 21. In the aforementioned first embodiment, in the situation where the low road surface friction mode is selected, the rotation speed difference gain $G_{DL}$ is set based on the map illustrated in FIG. 19, and, in the situation where the high road surface friction mode is selected, the rotation speed difference gain $G_{DH}$ is always set to "1". Differently, in the second embodiment, the rotation speed difference gain $G_D$ is set based on the map illustrated in FIG. 21, irrespective of the road surface friction state.

$$F_2 = G_D \times F_{b2} \quad (14)$$

Figure 21:
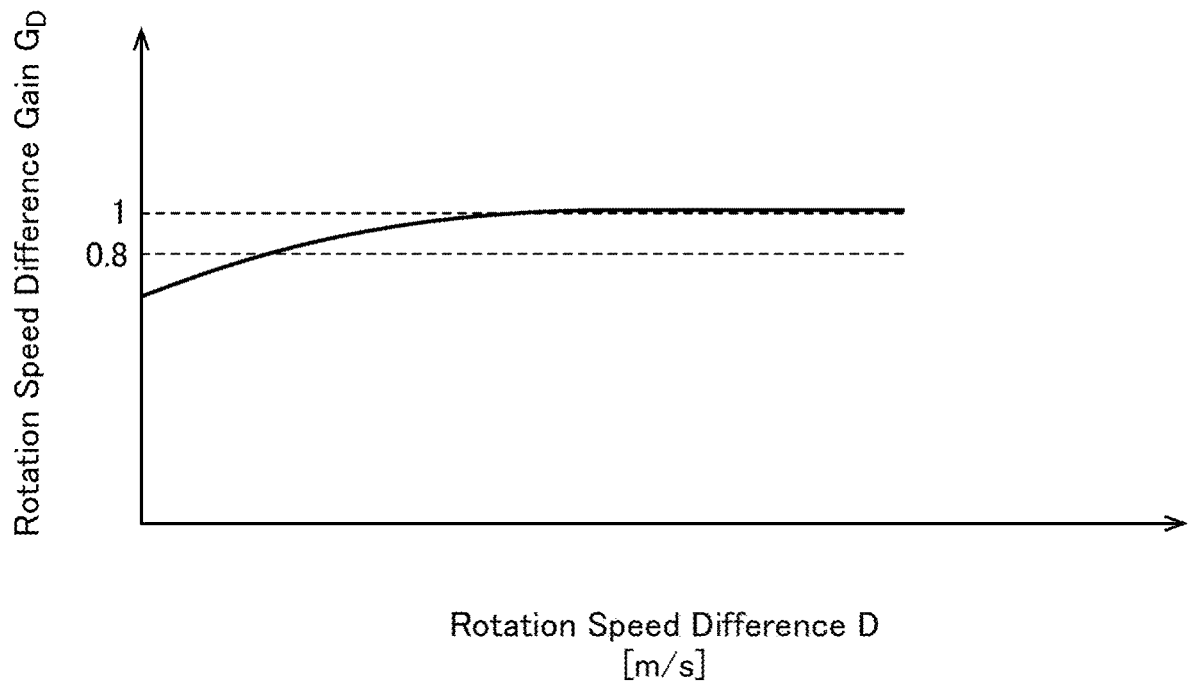
FIG. 21 is a map of a rotation speed difference gain by which a basic instruction value for brake LSD control is multiplied, in the vehicle attitude control system according to the second embodiment.

FIG. 21 shows the map for use in setting the rotation speed difference gain $G_D$.

As shown in FIG. 21, the rotation speed difference gain $G_D$ is set such that it has a value of about 0.8 or less in a range in which a rotation speed difference D [m/sec] between an inner road wheel and an outer road wheel is small, and gradually converges to "1" along with an increase in the rotation speed difference D. By setting the rotation speed difference D in this manner, the final instruction value for the brake LSD control increases along with an increase in the rotation speed difference. Further, because the rotation speed difference gain $G_D$ converges to "1" along with an increase in the rotation speed difference D, the final instruction value for the brake LSD control never excessively increases even in a situation where the road surface friction is large.

Further, the final instruction value $F_3$ for the pre-brake LSD control is calculated by multiplying the basic instruction value $F_{b3}$ by the same gains as those used in the vehicle attitude control. Specifically, the final instruction value $F_3$ is calculated by the following formula (15). The lower limit braking force based on the pre-brake LSD control is applied for the purpose of suppressing a change in braking force occurring in the period between completion of the application of the first braking force based on the vehicle attitude control and start of the application of the second braking force based on the brake LSD control. Therefore, with regard to the final instruction value for the pre-brake LSD control, the basic instruction value for the pre-brake LSD control is multiplied by the same gains as those used in the vehicle attitude control, thereby setting the lower limit braking force such that it is smoothly continuous with the first braking force based on the vehicle attitude control.

$$F_3 = G_\theta \times G_{AV} \times G_a \times G_I \times G_V \times F_{b3} \quad (15)$$

Then, in the step S125 illustrated in FIG. 20, current ones of the final instruction value $F_1$ for the vehicle attitude control, the final instruction value $F_2$ for the brake LSD control and the final instruction value $F_3$ for the pre-brake LSD control each calculated by a corresponding one of the formulas (13), (14) and (15) are compared with each other, and a largest one of the final instruction values is finally set as an instruction value of a braking force be applied to the inner rear road wheel. Further, the brake unit 8 of the inner rear road wheel is controlled by the braking force instruction value set in the step S125 illustrated in FIG. 20, in the same manner as that in the first embodiment.

In the aforementioned first embodiment, different instruction values are set, respectively, in the situation where the high road surface friction mode is selected and in the situation where the low road surface friction mode is selected, and therefore a braking force to be applied by the brake unit 8 is also set to different values, respectively, in the two situations. Differently, in the second embodiment, as long as a traveling state of the vehicle 1, such as the lateral acceleration acting on the vehicle 1, is the same, the same braking force is generated from the braking unit 8, irrespective of the road surface friction state of the road surface on which the vehicle 1 is traveling.

In the second embodiment, when the road wheel speed difference between the inner and outer rear road wheels of the vehicle 1 being turning is equal to or less than a first road wheel speed difference threshold $T_a$ [m/sec] in step S116 illustrated in FIG. 20, the processing subroutine proceeds to step S122. Thus, the basic instruction value $F_{b1}$ [N] for the vehicle attitude control is not set in the step S119 ($F_{b1}=0$). Similarly, when the road wheel speed difference between the outer and inner rear road wheels of the vehicle 1 being turning (inner road wheel speed—outer road wheel speed) is equal to or less than a second road wheel speed difference threshold $T_b$ [m/sec] in step S120 illustrated in FIG. 20, the processing subroutine proceeds to step S122. Thus, the basic instruction value $F_{b2}$ [N] for the brake LSD control is not set in the step S121 ($F_{b2}=0$). The basic instruction value $F_{b3}$ for the pre-brake LSD control is calculated by multiplying a maximum value of recently-set basic instruction values $F_{b1}$ by a given coefficient $C_{m3}$. Thus, when the basic instruction value $F_{b1}=0$, the basic instruction value $F_{b3}$ also becomes zero.

As above, in the second embodiment, when the road wheel speed difference between the outer and inner rear road wheels of the vehicle 1 being turning is equal to or less than the given threshold, all the basic instruction value $F_{b1}$, $F_{b2}$, $F_{b3}$ are zero, so that the application of a braking force by the brake unit 9 is not performed.

In the vehicle attitude control system according to the second embodiment, as long as the same lateral acceleration acts on the vehicle being traveling, the same braking force is generated, irrespective of the road surface friction state of the road surface on which the vehicle is traveling, so that it is possible to eliminate a need to change the control according to the road surface friction state and thus simply configure a control algorism. Further, in the vehicle attitude control system according to the second embodiment, when the road wheel speed difference is equal to or less than the given threshold, the application of the braking force is avoided, so that it is possible to suppress excessive intervention of a braking force by the brake unit 8, and, in a situation requiring a braking force, apply an appropriate braking force to suppress the uplift of the inner rear portion of the vehicle 1 being turning.

Although the present invention has been described based on a preferred embodiment thereof, it is to be understood that various changes and modifications may be made therein. Particularly, in the above embodiment, the vehicle attitude control system of the present invention has been applied to a rear drive vehicle, the vehicle attitude control system of the present invention may be applied to a vehicle having any other drive system, such as a 4-wheel drive vehicle.

LIST OF REFERENCE CHARACTERS

1: vehicle
1a: vehicle body
2a, 2b: front road wheel
2c, 2d: rear road wheel
2e: axle portion
3: suspension unit (road wheel suspension)
3a: upper arm (link mechanism)
3b: lower arm (link mechanism)
4: engine
4a: transmission
4b: propeller shaft
4c: differential gear unit
4d: LSD
6: steering wheel
7: steering device
8: brake unit (brake actuator)
10: hydraulic pump
12: valve unit
13: hydraulic pressure sensor
14: PCM
14a: brake control part (brake control device)
14b: turning control part
14c: anti-skid control part
16: steering angle sensor
18: accelerator position sensor
20: vehicle speed sensor
22: lateral acceleration sensor
24: road wheel speed sensor
26: mode setting switch

The invention claimed is:

1. A vehicle attitude control system for controlling an attitude of a vehicle having front and rear road wheels in which a road wheel suspension is configured such that a roll axis of a vehicle body inclines downwardly in a forward direction, comprising:
a lateral acceleration sensor configured to detect a lateral acceleration of the vehicle being traveling;
a brake actuator configured to apply a braking force to each road wheel of the vehicle; and
a brake control device configured to send a control signal to the brake actuator to cause the brake actuator to generate the braking force, based on a traveling state of the vehicle,
wherein the brake control device is configured to execute vehicle attitude control and pre-brake limited slip differential (LSD) control during turning of the vehicle based on turning manipulation of a steering wheel of the vehicle,
wherein in the vehicle attitude control, a braking force applied to an inner rear road wheel is greater when the lateral acceleration of the vehicle is greater than a predetermined lateral acceleration value than the braking force applied when the lateral acceleration of the vehicle is less than the predetermined lateral acceleration value, thereby suppressing uplift of an inner rear portion of the vehicle body, and
wherein in the pre-brake LSD control, a braking force less than a braking force applied by the vehicle attitude control is continuously applied to the inner rear road wheel while the vehicle is turning.

2. The vehicle attitude control system as recited in claim 1, which further comprises a road wheel speed sensor configured to detect a road wheel speed of each of the inner rear road wheel and an outer rear road wheel of the vehicle, wherein the brake control device is configured to set a braking force to be applied to the inner rear road wheel of the vehicle, based on a difference in road wheel speed between the inner rear road wheel and the outer rear road wheel detected by the road wheel speed sensor, and the lateral acceleration of the vehicle.

3. The vehicle attitude control system as recited in claim 1, which further comprises a vehicle speed sensor configured to detect a vehicle speed of the vehicle, wherein a braking force applied to the inner rear road wheel by the brake control device is greater when the vehicle speed detected by the vehicle speed sensor is greater than a predetermined speed value than the braking force applied when the vehicle speed detected by the vehicle speed sensor is less than the predetermined speed value.

4. The vehicle attitude control system as recited in claim 1, which further comprises an accelerator position sensor, wherein a braking force applied to the inner rear road wheel by the brake control device is greater when an accelerator position detected by the accelerator position sensor is greater than a predetermined accelerator position than the braking force applied when the accelerator position detected by the accelerator position sensor is less than the predetermined accelerator position.

5. The vehicle attitude control system as recited in claim 1, which further comprises a steering angle sensor configured to detect a steering angle of a steering wheel of the vehicle, wherein the brake control device is configured to avoid executing the vehicle attitude control, when the steering angle detected by the steering angle sensor according to turning manipulation of the steering wheel is equal to or less than a given value.

6. The vehicle attitude control system as recited in claim 1, wherein the brake control device is configured to be capable of executing the vehicle attitude control in a low road surface friction mode and in a high road surface friction mode, an estimated friction coefficient of a road surface being higher in the high road surface friction mode than in the low road surface friction mode, and wherein the brake control device is configured to generate different braking forces with respect to a same lateral acceleration, in the low road surface friction mode and in the high road surface friction mode, respectively.

7. The vehicle attitude control system as recited in claim 1, wherein the brake control device is configured to be capable of executing the vehicle attitude control in a low road surface friction mode and in a high road surface friction mode, an estimated friction coefficient of a road surface being higher in the high road surface friction mode than in the low road surface friction mode, and wherein the brake control device is configured to execute the vehicle attitude control when the lateral acceleration of the vehicle becomes equal to or greater than a first lateral acceleration value in the high road surface friction mode, and to execute the vehicle attitude control when the lateral acceleration of the vehicle becomes equal to or greater than a second lateral acceleration value, which is different from the first lateral acceleration value, in the low road surface friction mode.

8. The vehicle attitude control system as recited in claim 1, which further comprises a vehicle speed sensor configured to detect a vehicle speed of the vehicle, wherein the brake control device is configured to change a condition for starting the execution of the vehicle attitude control, according to the vehicle speed detected by the vehicle speed sensor.

9. The vehicle attitude control system as recited in claim 1, wherein the road wheel suspension comprises a link mechanism which suspends an axle portion of each of the rear road wheels with respect to the vehicle body, wherein the link mechanism suspends the axle portion such that the axle portion is swingable about a given suspension center, and wherein the suspension center is located above the axle portion.

10. The vehicle attitude control system as recited in claim 1, wherein the vehicle comprises a mechanical limited slip differential configured to mechanically control a difference in road wheel speed difference between the inner rear road wheel and an outer rear road wheel, according to a torque supplied to each of the inner rear road wheel and the outer rear road wheel,
wherein the vehicle attitude control system further comprises an accelerator position sensor, and
wherein the brake control device is configured such that the braking force to be applied to the inner rear road wheel decreases as a change rate of an accelerator position detected by the accelerator position sensor increases.

11. The vehicle attitude control system as recited in claim 2, which further comprises a vehicle speed sensor configured to detect a vehicle speed of the vehicle, wherein the brake control device is configured to change a condition for starting the execution of the vehicle attitude control, according to the vehicle speed detected by the vehicle speed sensor.

12. The vehicle attitude control system as recited in claim 2, wherein the road wheel suspension comprises a link mechanism which suspends an axle portion of each of the rear road wheels with respect to the vehicle body, wherein the link mechanism suspends the axle portion such that the axle portion is swingable about a given suspension center, and wherein the suspension center is located above the axle portion.

13. The vehicle attitude control system as recited in claim 2, wherein the vehicle comprises a mechanical limited slip differential configured to mechanically control a difference in road wheel speed difference between the inner rear road wheel and an outer rear road wheel, according to a torque supplied to each of the inner rear road wheel and the outer rear road wheel,
wherein the vehicle attitude control system further comprises an accelerator position sensor, and
wherein the brake control device is configured such that the braking force to be applied to the inner rear road wheel decreases as a change rate of an accelerator position detected by the accelerator position sensor increases.

14. The vehicle attitude control system as recited in claim 1, wherein the brake control device is configured to generate a same braking force, as long as a same lateral acceleration acts on the vehicle being traveling, irrespective of a road surface friction state of a road surface on which the vehicle is traveling, and the brake control device is configured to avoid the application of the braking force when a difference in road wheel speed between the inner rear road wheel and an outer rear road wheel is equal to or less than a given threshold.

* * * * *